(12) United States Patent
Fujimoto et al.

(10) Patent No.: US 12,055,211 B2
(45) Date of Patent: Aug. 6, 2024

(54) DRIVE DEVICE

(71) Applicant: NIDEC CORPORATION, Kyoto (JP)

(72) Inventors: Shohei Fujimoto, Kyoto (JP); Ayumi Nakagawa, Kyoto (JP); Shuhei Nakamatsu, Kyoto (JP); Yusuke Makino, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 18/461,511

(22) Filed: Sep. 6, 2023

(65) Prior Publication Data
US 2023/0407958 A1 Dec. 21, 2023

Related U.S. Application Data

(63) Continuation of application No. 17/696,875, filed on Mar. 17, 2022, now Pat. No. 11,781,643.

(30) Foreign Application Priority Data

Mar. 26, 2021 (JP) .................. 2021-054233

(51) Int. Cl.
| | |
|---|---|
| F16H 57/04 | (2010.01) |
| F16H 57/021 | (2012.01) |
| F16H 57/031 | (2012.01) |
| B60K 1/00 | (2006.01) |
| F16H 57/02 | (2012.01) |

(52) U.S. Cl.
CPC ....... *F16H 57/0476* (2013.01); *F16H 57/021* (2013.01); *F16H 57/031* (2013.01); *F16H 57/0415* (2013.01); *F16H 57/0423* (2013.01); *F16H 57/0424* (2013.01); *F16H 57/0441* (2013.01); *F16H 57/045* (2013.01); *F16H 57/0471* (2013.01); *B60K 2001/001* (2013.01); *F16H 2057/02034* (2013.01); *F16H 2057/02052* (2013.01)

(58) Field of Classification Search
CPC ... F16H 57/031; F16H 57/021; F16H 57/0476
See application file for complete search history.

(56) References Cited

U.S. PATENT DOCUMENTS

| | | | |
|---|---|---|---|
| 11,114,921 B2 * | 9/2021 | Ito | ......... F16H 57/045 |
| 11,578,798 B2 | 2/2023 | Nakata et al. | |
| 2020/0408297 A1 * | 12/2020 | Ishikawa | ........... F16H 57/021 |

(Continued)

OTHER PUBLICATIONS

Fujimoto et al.; "Drive Device", U.S. Appl. No. 17/696,875, filed Mar. 17, 2022.

*Primary Examiner* — Michael A Riegelman
(74) *Attorney, Agent, or Firm* — HAUPTMAN HAM, LLP

(57) ABSTRACT

In a drive device, a first flow path of a fluid connects a gear accommodation portion and an inlet of a pump. A second flow path connects an outlet of the pump and one end of a third flow path via a cooler. The third flow path is inside a partition wall of a housing and intersects a rotation axis of a first shaft. A fourth flow path connects another end of the third flow path and one end of a fifth flow path. The fifth flow path is inside a gear side lid of the housing. Another end of the fifth flow path is connected to one end of a second shaft in an axial direction. One end of a sixth flow path is connected to another end of the third flow path. Another end of the sixth flow path is inside a housing tubular portion.

20 Claims, 14 Drawing Sheets

(56) References Cited

U.S. PATENT DOCUMENTS

| | | | |
|---|---|---|---|
| 2022/0205530 A1* | 6/2022 | Ishikawa | H02K 9/19 |
| 2022/0282781 A1* | 9/2022 | Nakata | F16H 57/0483 |
| 2022/0282783 A1* | 9/2022 | Nakata | F16H 57/0424 |
| 2022/0282784 A1* | 9/2022 | Nakata | F16H 57/0424 |
| 2022/0286011 A1* | 9/2022 | Nakata | H02K 5/161 |
| 2022/0294317 A1* | 9/2022 | Nakamura | B60L 50/51 |
| 2022/0307586 A1* | 9/2022 | Fujimoto | F16H 57/0471 |
| 2022/0321050 A1* | 10/2022 | Jono | F16H 57/0413 |
| 2022/0376588 A1* | 11/2022 | Nakamura | F16H 57/0417 |
| 2023/0067898 A1* | 3/2023 | Oki | F16H 57/0409 |
| 2023/0069613 A1* | 3/2023 | Osuga | H02K 7/083 |
| 2023/0082913 A1* | 3/2023 | Nakamatsu | F16H 57/021 |
| | | | 475/84 |
| 2023/0090548 A1* | 3/2023 | Ishikawa | H02K 5/203 |
| | | | 310/68 D |
| 2023/0136544 A1* | 5/2023 | Nakata | F16H 57/043 |
| | | | 184/6.12 |
| 2023/0407958 A1* | 12/2023 | Fujimoto | F16H 57/021 |

* cited by examiner

DRIVE DEVICE

CROSS-REFERENCE TO RELATED APPLICATIONS

The present application is a continuation of application Ser. No. 17/696,875, filed Mar. 17, 2022, which claims priority under 35 U.S.C. § 119 to Japanese Patent Application No. 2021-054233 filed on Mar. 26, 2021, the entire contents of which applications are incorporated herein by reference.

FIELD OF THE INVENTION

The present invention relates to a drive device.

BACKGROUND

Conventionally, a drive device in which a flow path of an oil pumped up by a pump is formed is known. For example, the flow path is branched into a lubricating circuit for supplying an oil pumped up by a mechanical oil pump to a power transmission mechanism and a cooling circuit for supplying an oil pumped up by an electric oil pump to an electric motor.

However, both the mechanical oil pump and the electric oil pump are mounted on the above-described drive device. Thus, there is a concern that a size of the entire drive device increases.

SUMMARY

An exemplary drive device of the present invention includes a motor portion, a gear portion, a housing, a pump, a cooler, and a fluid flow path. The motor portion has a rotor and a stator. The rotor has a first shaft. The first shaft is rotatable about a rotation axis extending in an axial direction. The stator is disposed radially outward of the rotor. The gear portion is attached to one axial direction side of the first shaft. The housing accommodates the motor portion and the gear portion. The pump delivers a fluid within the housing. The cooler cools the fluid. The fluid flows through the fluid flow path. The first shaft a tubular shape extending in the axial direction and has a shaft through-hole. The shaft through-hole penetrates in a radial direction. The gear portion further has a second shaft. The second shaft has a tubular shape extending in the axial direction, and is connected to one end portion of the first shaft in the axial direction. The housing has a housing tubular portion, a partition wall, and a gear side lid portion. The housing tubular portion extends in the axial direction and accommodates the motor portion. The partition wall closes one end portion of the housing tubular portion in the axial direction. The gear side lid portion constitutes a gear accommodation portion in cooperation with the partition wall. The gear accommodation portion is disposed at one end portion of the partition wall in the axial direction and accommodates the gear portion. The fluid flow path includes a first flow path, a second flow path, a third flow path, a fourth flow path, a fifth flow path, and a sixth flow path. The first flow path connects the gear accommodation portion and a first inlet of the pump. The second flow path connects a first outlet of the pump and one end portion of the third flow path via the cooler. The third flow path is disposed inside the partition wall and extends in a direction intersecting with the rotation axis. The fourth flow path connects an other end portion of the third flow path and one end portion of the fifth flow path. The fifth flow path is disposed inside the gear side lid portion. An other end portion of the fifth flow path is connected to one end portion of the second shaft in the axial direction. One end portion of the sixth flow path is connected to the other end portion of the third flow path. An other end portion of the sixth flow path is disposed within the housing tubular portion.

The above and other elements, features, steps, characteristics and advantages of the present disclosure will become more apparent from the following detailed description of the preferred embodiments with reference to the attached drawings.

DETAILED DESCRIPTION

Figure 1:
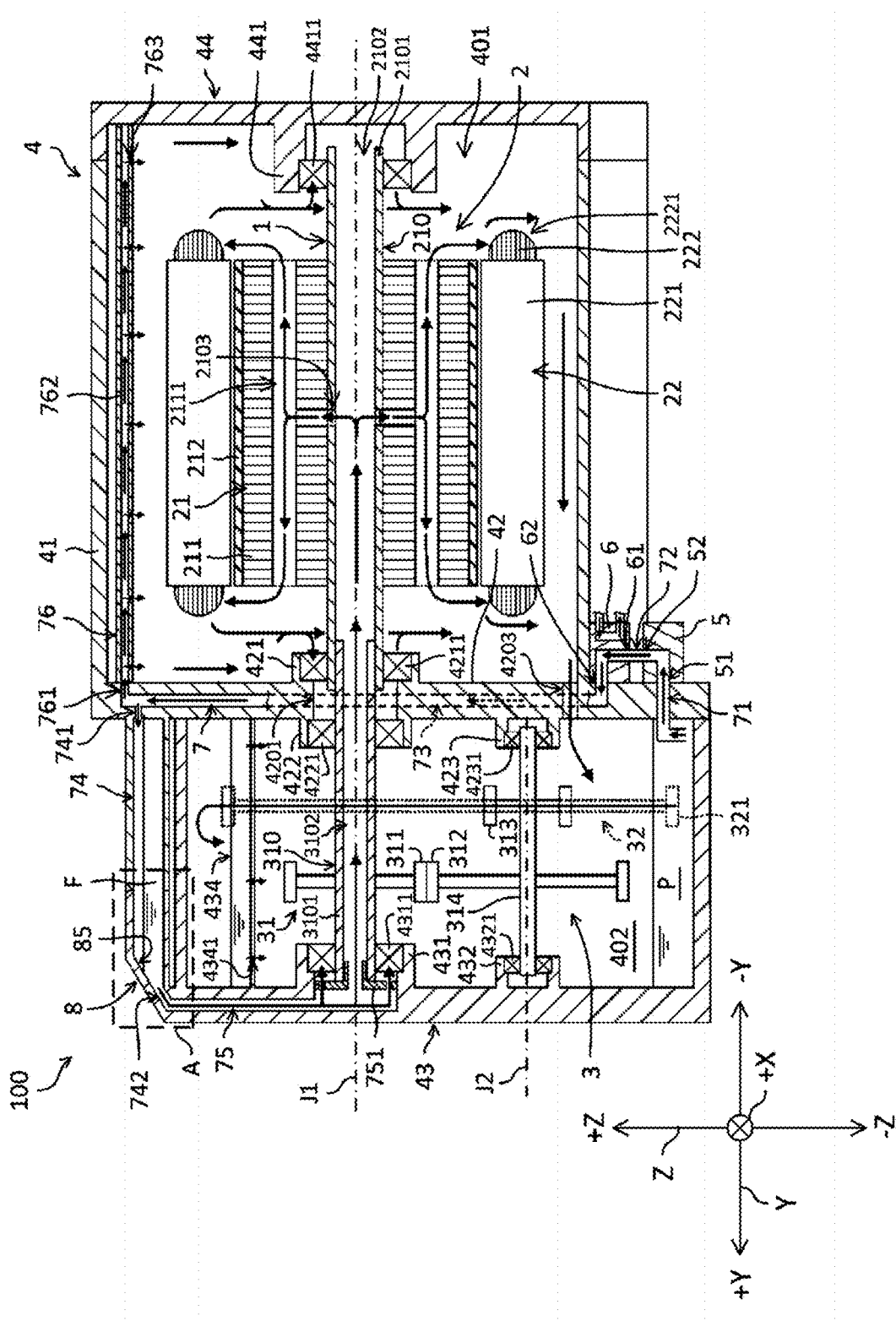
FIG. 1 is a schematic diagram illustrating a configuration example of a drive device viewed from an X-axis direction.

Hereinafter, an exemplary embodiment will be described with reference to the drawings.

The following description will be made with a gravity direction being partitioned based on a positional relationship in a case where a drive device 100 is mounted in a vehicle 300 located on a horizontal road surface. In addition, in the drawings, an XYZ coordinate system is illustrated appropriately as a three-dimensional orthogonal coordinate system. In the XYZ coordinate system, a Z-axis direction indicates a vertical direction (that is, up-down direction). A +Z direction is upward (vertically upward opposite to the gravity direction), and a −Z direction is downward (vertically downward in the same direction as the gravity direction). Note that, a "Z-axis direction" in the following description is an example of a "second direction" of the present invention. A "−Z direction" is an example of "one side in the second direction" of the present invention, and the "+Z direction" is an example of an "other side in the second direction" of the present invention.

In addition, an X-axis direction is a direction orthogonal to the Z-axis direction and illustrates a front-rear direction of the vehicle 300 in which the drive device 100 is mounted. A +X direction is the front of the vehicle 300, and a −X direction is the rear of the vehicle 300. However, the +X direction can be the rear of the vehicle 300, and the −X direction can be the front of the vehicle 300. Note that, the "X-axis direction" in the following description is an example of a "first direction" of the present invention. Further, the "−X direction" is an example of "one side in the first direction" of the present invention, and the "+X direction" is an example of an "other side in the first direction" of the present invention.

A Y-axis direction is a direction perpendicular to both the X-axis direction and the Z-axis direction, and is a width direction (right-left direction) of the vehicle 300. A +Y direction is to the left of the vehicle 300 and a −Y direction is to the right of the vehicle 300. However, when the +X direction is the rear of the vehicle 300, the +Y direction can be the right of the vehicle 300, and the −Y direction can be the left of the vehicle 300. That is, regardless of the X-axis direction, the +Y direction simply becomes one side in the right-left direction of the vehicle 300, and the −Y direction becomes the other side in the right-left direction of the vehicle 300. In addition, depending on a method for mounting the drive device 100 on the vehicle 300, the X-axis direction can be the width direction (right-left direction) of the vehicle 300, and the Y-axis direction can be the front-rear direction of the vehicle 300. In the following embodiment, the Y-axis direction is parallel to, for example, a rotation axis J1 of a motor portion 2. Note that, the "Y-axis direction" in the following description is an example of an "axial direction" of the present invention. In addition, the "+Y direction" is an example of "one axial direction" of the present invention, and the "−Y direction" is an example of an "other axial direction" of the present invention.

Unless otherwise specified in the following description, a direction (Y-axis direction) parallel to a predetermined axis such as the rotation axis J1 of the motor portion 2 may be simply referred to as an "axial direction". In addition, a direction orthogonal to a predetermined axis is referred to as a "radial direction". In the radial direction, an orientation approaching an axis is referred to as a "radial inner side", and an orientation separating from the axis is referred to as a "radial outer side". In each component, an end portion radially inward is referred to as a "radially inner end portion". Furthermore, an end portion outward is referred to as a "radially outer end portion". In addition, on side surfaces of each component, a side surface facing the radially inner side is referred to as a "radially inner surface", and a side surface facing the radially outer side is referred to as a "radially outer surface".

In addition, a rotation direction about a predetermined axis is referred to as a "circumferential direction Dr". When viewed from the −Y direction to the +Y direction, a counterclockwise direction is referred to as "one circumferential direction Dr1", and a clockwise direction is referred to as an "other circumferential direction Dr2".

In addition, in the present specification, an "annular shape" includes not only a shape continuously connected without any cut along the entire circumferential direction Dr about a predetermined axis but also a shape having one or more cuts in a part of the entire circumference direction about the predetermined axis. In addition, the annular shape also includes a shape that draws a closed curve on a curved surface that intersects with a predetermined axis as the center.

In addition, in a positional relationship between any one and another of the azimuth, the line, and the surface, "parallel" includes not only a state in which the two endlessly extend without intersecting at all but also a state in which the two are substantially parallel. In addition, "orthogonal" and "perpendicular" include not only a state where the two intersect each other at 90 degrees, but also a state where the two are substantially orthogonal and a state where the two are substantially perpendicular. That is, the terms "parallel", "perpendicular", and "orthogonal" each include a state in which the positional relationship between both has an angular deviation that does not depart from the gist of the present invention.

Note that, these terms are names used merely for description, and are not intended to limit actual positional relationships, directions, names, and the like.

Figure 2:
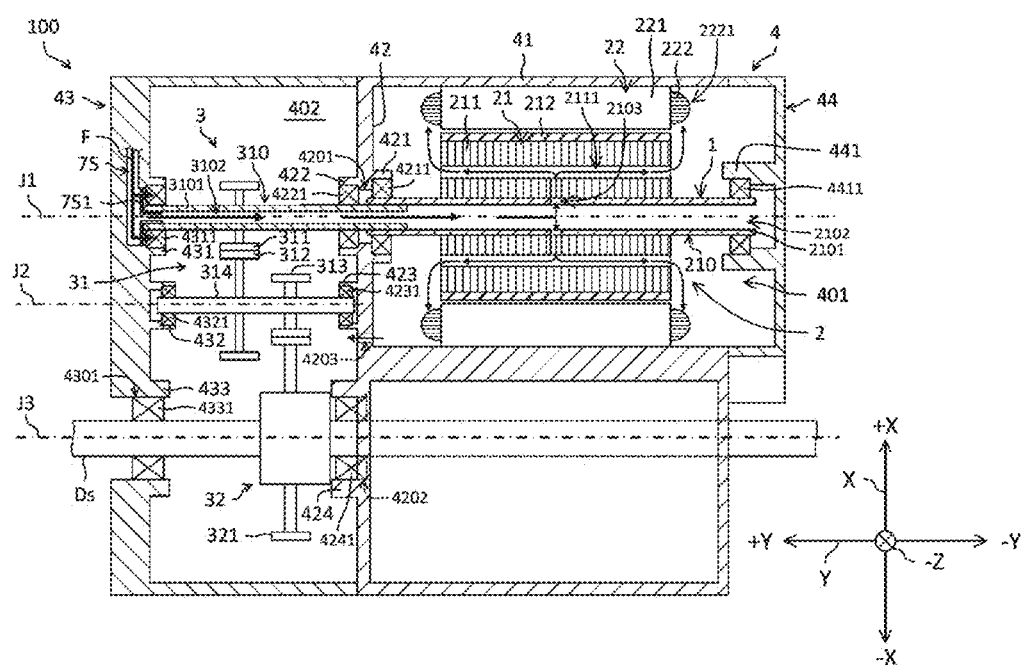
FIG. 2 is a schematic diagram of the drive device viewed from a Z-axis direction.
Figure 3:
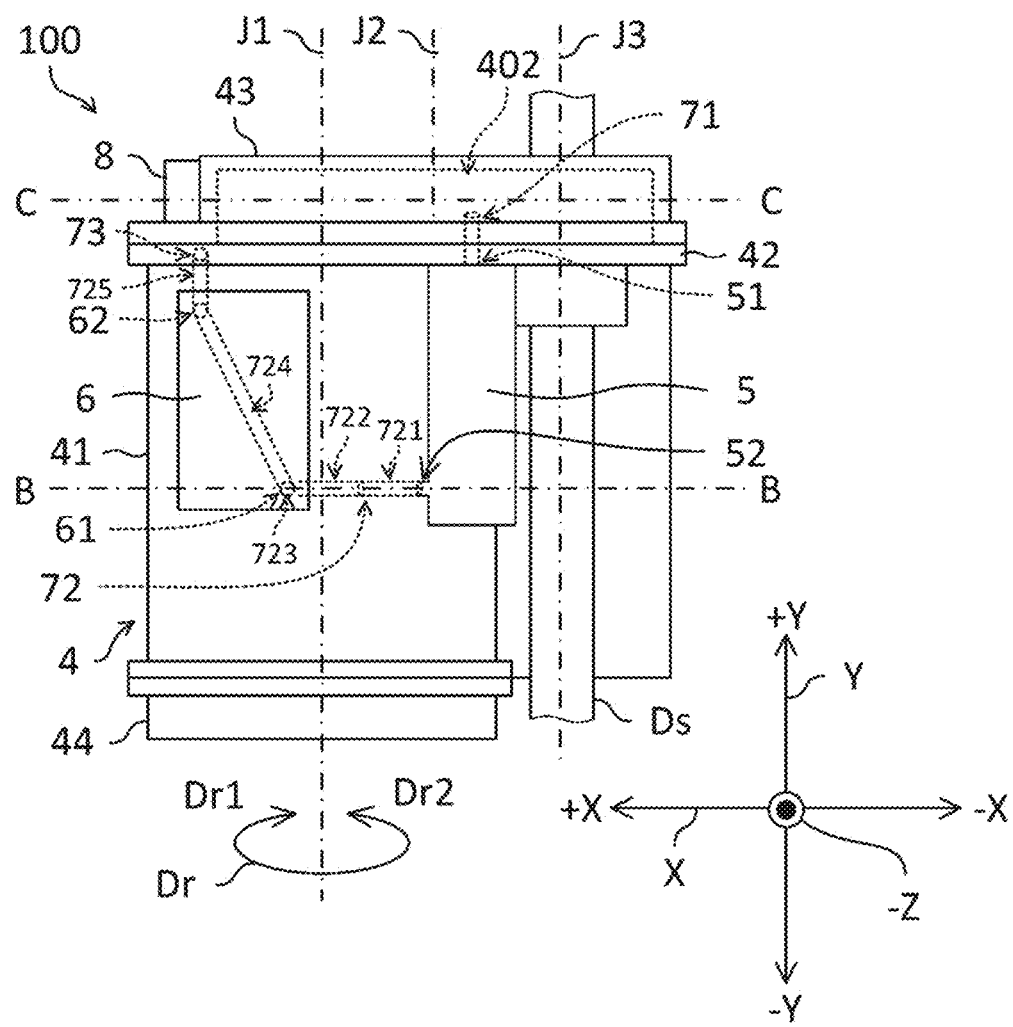
FIG. 3 is a schematic diagram of a lower surface of the drive device.
Figure 4:
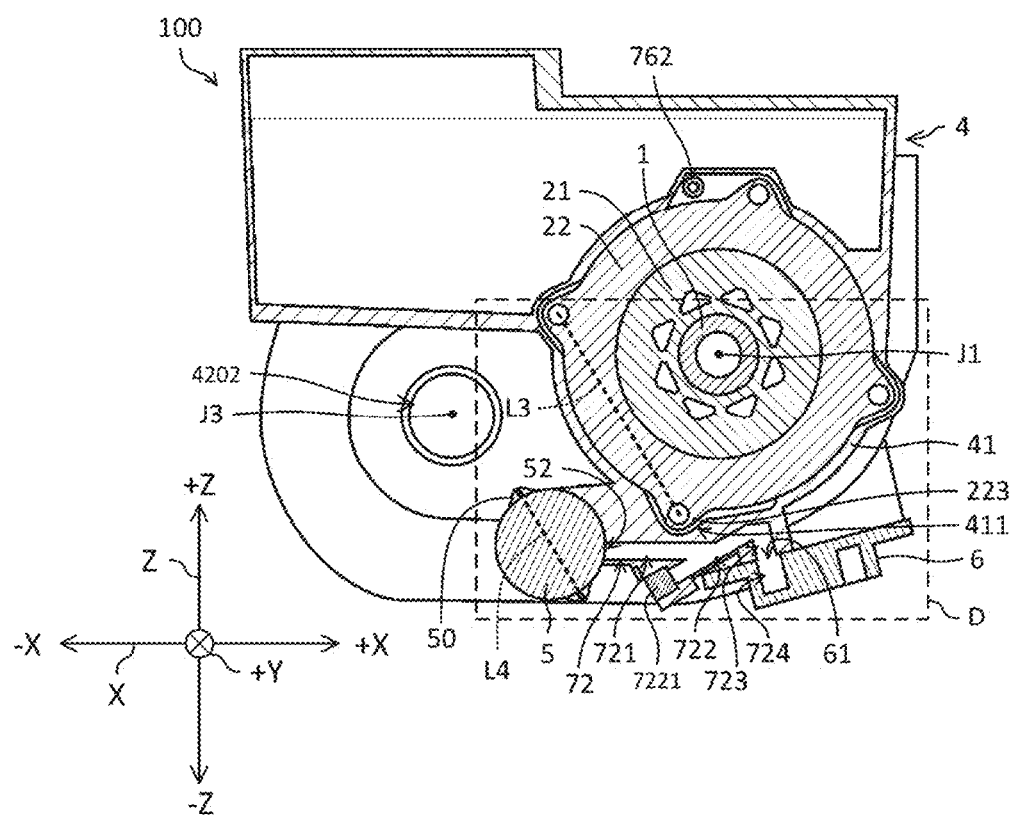
FIG. 4 is a cross-sectional view of the drive device viewed from a Y-axis direction.
Figure 5:
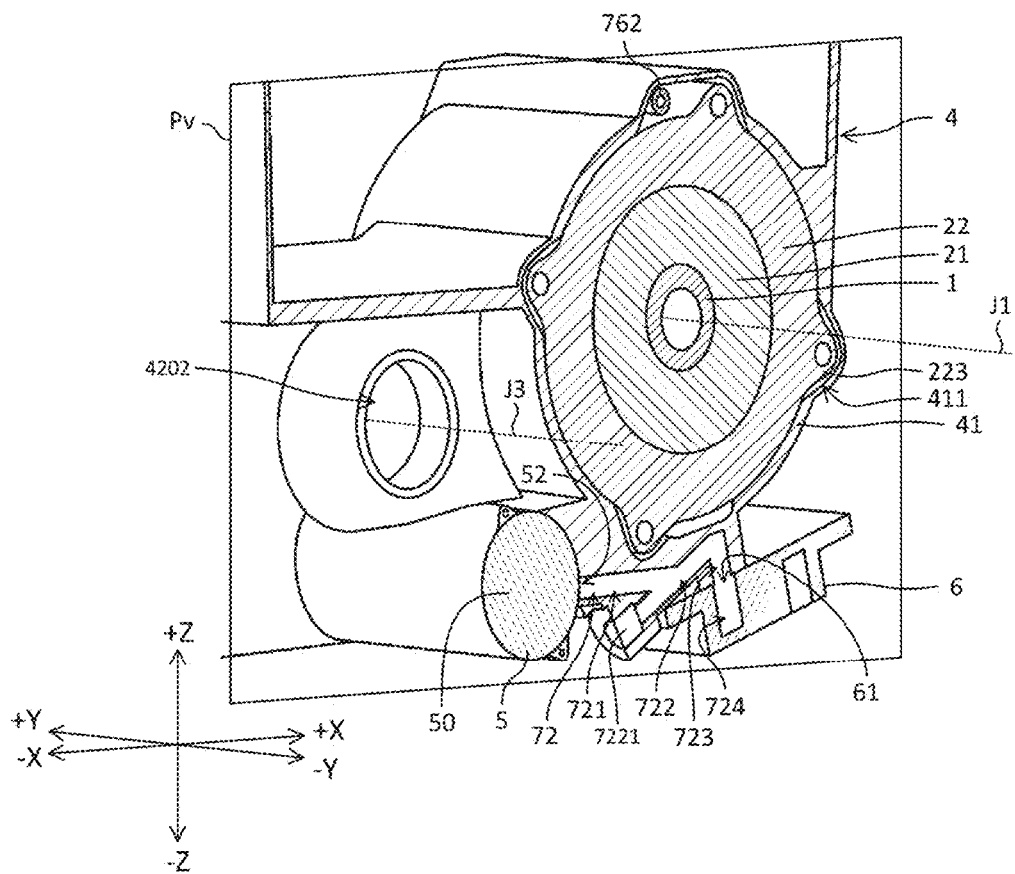
FIG. 5 is a perspective cross-sectional view of the drive device viewed from the Y-axis direction.
Figure 6:
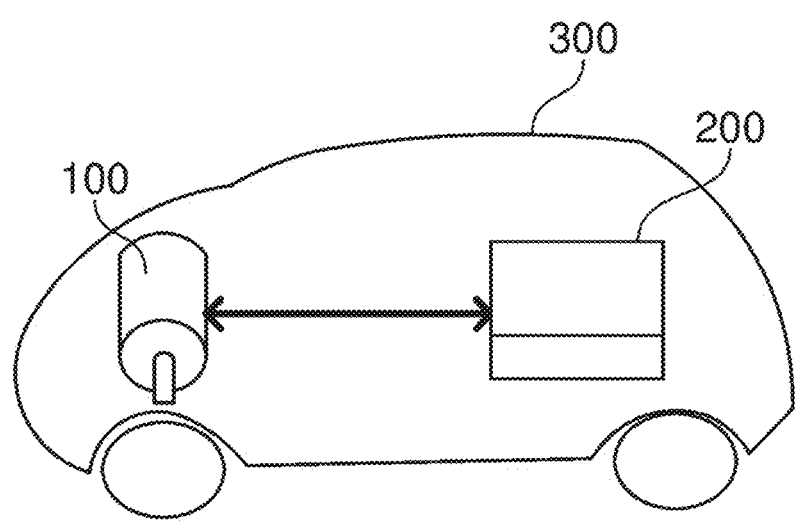
FIG. 6 is a schematic diagram illustrating an example of a vehicle having the drive device mounted thereon.

FIG. 1 is a schematic diagram illustrating a configuration example of the drive device 100 viewed from the X-axis direction. FIG. 2 is a schematic diagram of the drive device 100 viewed from the Z-axis direction. FIG. 3 is a schematic diagram of a lower surface of the drive device 100. FIG. 4 is a cross-sectional view of the drive device 100 viewed from the Y-axis direction. FIG. 5 is a perspective cross-sectional view of the drive device 100 viewed from the Y-axis direction. FIG. 6 is a schematic diagram illustrating an example of the vehicle 300 having the drive device 100 mounted thereon. Note that, FIG. 3 illustrates the drive device 100 viewed from the −Z direction toward the +Z direction. FIGS. 4 and 5 illustrate a cross-sectional structure when the drive device 100 is cut along a virtual plane including a dashed dotted line B-B in FIG. 3 and perpendicular to the Y-axis direction. FIG. 4 illustrates a cross-sectional structure viewed from the −Y direction toward the +Y direction. FIG. 5 illustrates a cross-sectional structure of the drive device 100 in FIG. 4 obliquely viewed from the −Y direction to the +Y direction. In addition, FIGS. 1 to 5 are merely conceptual diagrams, and the layout and dimensions of each portion are not necessarily the same as those of the actual drive device 100. In addition, FIG. 6 conceptually illustrates the vehicle 300.

In the present embodiment, as illustrated in FIG. 6, the drive device 100 is mounted on the vehicle 300 using at least a motor as a power source. The vehicle 300 is, for example, a hybrid vehicle (HV), a plug-in hybrid vehicle (PHV), and an electric vehicle (EV). The drive device 100 is used as a power source of the above-described vehicle 300. The vehicle 300 has the drive device 100 and a battery 200. The battery 200 stores electric power to be supplied to the drive device 100. In the example of the vehicle 300, the drive device 100 drives right and left front wheels. Note that, the drive device 100 may drive at least any of the wheels.

As illustrated in FIGS. 1 to 5, the drive device 100 includes a motor shaft 1, a motor portion 2, a gear portion 3, a housing 4, a pump 5, a cooler 6, and a fluid flow path 7.

The motor shaft 1 extends in the Y-axis direction along the rotation axis J1 parallel to a horizontal direction, and is rotatable about the rotation axis J1. In the present embodiment, the motor shaft 1 is divided at a central portion in the Y-axis direction, and has a first shaft 210 and a second shaft 310 to be described later. However, the present invention is not limited to this example, and the motor shaft 1 may not be divided at the central portion in the Y-axis direction, and may have only the first shaft 210, for example. In this case, an end portion of the first shaft 210 on the +Y direction side is rotatably supported by a second gear bearing holding portion 431 via a second gear bearing 4311 to be described later.

Next, the motor portion 2 will be described with reference to FIGS. 1 to 5. The motor portion 2 is a drive source of the drive device 100, and is driven by electric power from an inverter unit (not illustrated). As illustrated in FIG. 1, the motor portion 2 has a rotor 21 and a stator 22. As described above, the drive device 100 includes the motor portion 2. The rotor 21 has the first shaft 210. The first shaft 210 is rotatable about the rotation axis J1 extending along the Y-axis direction. The stator 22 is disposed radially outward of the rotor 21. That is, the motor portion 2 is an inner rotor motor. Electric power is supplied from a power source unit (not illustrated) of the drive device 100 to the stator 22, and thus, the rotor 21 rotates.

The first shaft 210 has a tubular shape extending in the Y-axis direction. The first shaft 210 has a first shaft tubular portion 2101 and a first hollow portion 2102. The first shaft tubular portion 2101 extends in the Y-axis direction along the rotation axis J1. The first hollow portion 2102 is a space surrounded by the first shaft tubular portion 2101 and is disposed inside the first shaft tubular portion 2101.

In addition, the first shaft 210 further has shaft through-holes 2103 penetrating in the radial direction. The shaft through-holes 2103 are disposed in the first shaft tubular portion 2101 and penetrate the first shaft tubular portion 2101 in the radial direction. A fluid F flows inside the first shaft 210. The fluid F is used as a lubricating liquid for lubricating the gear portion 3. In addition, the fluid F is also used as a refrigerant for cooling the motor portion 2 and the gear portion 3. An oil equivalent to a lubricating oil for an automatic transmission having a low viscosity (ATF: Automatic Transmission Fluid) is preferably used as the fluid F since the fluid has lubrication and cooling functions. When the motor shaft 1 rotates, the fluid F within the first shaft 210 flows out from the first hollow portion 2102 to the outside of the first shaft 210 through the shaft through-holes 2103 by centrifugal force. In the present embodiment, as illustrated in FIG. 1, the shaft through-holes 2103 are disposed in the −Y direction from an end portion of the rotor 21 on the +Y direction side and in the +Y direction from an end portion of the rotor 21 on the −Y direction side, and is connected to a rotor through-hole 2111 to be described later.

However, the present invention is not limited to the above-described example, and the shaft through-holes 2103 may be disposed in the +Y direction from the end portion of the rotor 21 on the +Y direction side, or may be disposed in the −Y direction from the end portion of the rotor 21 on the −Y direction side. That is, at least some of the shaft through-holes 2103 may be disposed in at least any positions thereof. In addition, the number of shaft through-holes 2103 may be one, or a plurality of shaft through-holes may be disposed in the circumferential direction Dr or the Y-axis direction.

In addition, the rotor 21 further has a rotor core 211 and magnets 212. In the present embodiment, the rotor core 211 is a stacked body in which a plurality of plate-shaped electromagnetic steel plates are stacked. The rotor core 211 is a cylindrical body extending along the Y-axis direction, and is fixed to a radially outer surface of the first shaft 210. A plurality of magnets 212 are fixed to the rotor core 211. The plurality of magnets 212 are aligned along the circumferential direction Dr with magnetic poles disposed alternately.

In addition, the rotor core 211 has a rotor through-hole 2111. The rotor through-hole 2111 penetrates the rotor core 211 in the Y-axis direction and is connected to the shaft through-hole 2103. The rotor through-hole 2111 is used as a flow path of the fluid F that also functions the refrigerant.

When the rotor 21 rotates, the fluid F flowing through the first hollow portion 2102 of the first shaft 210 flows into the rotor through-hole 2111 via the shaft through-hole 2103. In addition, the fluid F flowing into the rotor through-hole 2111 flows out from end portions of the rotor through-hole 2111 on both sides in the Y-axis direction to the outside. A part of the flown fluid F flies toward the stator 22 and cools, for example, a coil portion 222 (particularly, a coil end 2221). In addition, a part of the flowed fluid F flies toward a first motor bearing 4211 and a second motor bearing 4411 that rotatably support the first shaft 210, and lubricates and cools the bearings.

The stator 22 has a stator core 221 and the coil portion 222. The stator 22 is held by a housing tubular portion 41 to be described later. The stator core 221 has a plurality of magnetic pole teeth (not illustrated) extending radially inward from an inner peripheral surface of an annular yoke. The coil portion 222 is formed by winding a conductive wire around the magnetic pole teeth via an insulator (not illustrated). The coil portion 222 has the coil end 2221 protruding from an end face of the stator core 221 in the axial direction.

The stator 22 further has protrusion portions 223 (see, for example, FIG. 4). The protrusion portions 223 protrude radially outward at the radially outer end portion of the stator 22, and extend in the Y-axis direction. In the present embodiment, the protrusion portions 223 are portions for fixing the stator 22 to the housing 4. The protrusion portions 223 are disposed at a radially outer end portion of the stator core 221. A plurality of the protrusion portions 223 of the stator 22 are aligned in the circumferential direction. A through-hole (reference numeral is omitted) extending in the Y-axis direction is formed in the protrusion portion 223. A bolt extending in the Y-axis direction is inserted into the through-hole. The stator 22 is fixed to the housing 4 by screwing the bolt into, for example, a partition wall 42 to be described later of the housing 4. In addition, a recess portion 411 is disposed on an inner surface of the housing tubular portion 41 (see, for example, FIG. 4). The recess portion 411 is recessed radially outward and extends in the Y-axis direction. At least a part of the protrusion portions 223 is accommodated in the recess portion 411. As a result, it is possible to more reliably prevent the stator 22 from rotating in the circumferential direction about the housing tubular portion 41.

Next, details of the gear portion 3 will be described with reference to FIGS. 1 and 2. The gear portion 3 is attached to the +Y direction side of the motor shaft 1. As described above, the drive device 100 includes the gear portion 3. Specifically, the gear portion 3 is attached to the +Y direction side of the first shaft 210, and transmits power of the motor portion 2 to output shafts Ds. The gear portion 3 has a reduction gear 31 and a differential 32.

The reduction gear 31 is connected to the motor shaft 1, and is connected to, specifically, the +Y direction side of the first shaft 210. The reduction gear 31 has a function of reducing a rotation speed of the motor shaft 1 and increasing torque output from the motor portion 2 according a reduction ratio. The reduction gear 31 transmits the torque output from the motor portion 2 to the differential 32.

The reduction gear 31 has a second shaft 310. The second shaft 310 is a tubular shape extending in the Y-axis direction, and is connected to an end portion of the first shaft 210 on the +Y direction side. As described above, the gear portion 3 has the second shaft 310. The second shaft 310 is rotatable about the rotation axis J1 together with the first shaft 210. In the present embodiment, the second shaft 310 is inserted into the end portion of the first shaft 210 on the +Y direction side and is connected by spline fitting. However, the present invention is not limited to the example, and the second shaft and the first shaft may be connected by a screw coupling using a male screw and a female screw, or may be joined by a fixing method such as welding. When the fixing method such as press-fitting or welding is adopted, serrations combining recess portions and protrusion portions extending in the Y-axis direction may be adopted. With such a configuration, it is possible to reliably transmit the rotation.

The second shaft 310 has a second shaft tubular portion 3101, and a second hollow portion 3102. The second shaft tubular portion 3101 extends in the Y-axis direction along the rotation axis J1. An end portion of the second shaft tubular portion 3101 on the −Y direction side is inserted into and connected to an end portion of the first shaft tubular portion 2101 on the +Y direction side. The second hollow portion 3102 is a space surrounded by the second shaft tubular portion 3101, is disposed inside the second shaft tubular portion 3101, and is connected to the first hollow portion 2102.

In addition, the reduction gear 31 further has a main drive gear 311, an intermediate driven gear 312, and a final drive gear 313. The main drive gear 311 is rotatable about the rotation axis J1 together with the motor shaft 1. The intermediate driven gear 312 meshes with the main drive gear 311. The final drive gear 313 meshes with a ring gear 321 to be described later of the differential 32. In addition, the reduction gear 31 further has an intermediate shaft 314. The torque output from the motor portion 2 is transmitted to the ring gear 321 of the differential 32 via the second shaft 310, the main drive gear 311, the intermediate driven gear 312, the intermediate shaft 314, and the final drive gear 313.

The main drive gear 311 is disposed on an outer peripheral surface of the motor shaft 1, and is disposed on, specifically, a radially outer surface of the second shaft tubular portion 3101. The main drive gear 311 may be the same member as the second shaft tubular portion 3101, or may be another member. In the latter case, the main drive gear 311 is firmly fixed to the second shaft tubular portion 3101 by shrink fitting or the like.

The intermediate driven gear 312 and the final drive gear 313 are rotatable about an intermediate axis J2 extending in the Y-axis direction together with the intermediate shaft 314.

Figure 7:
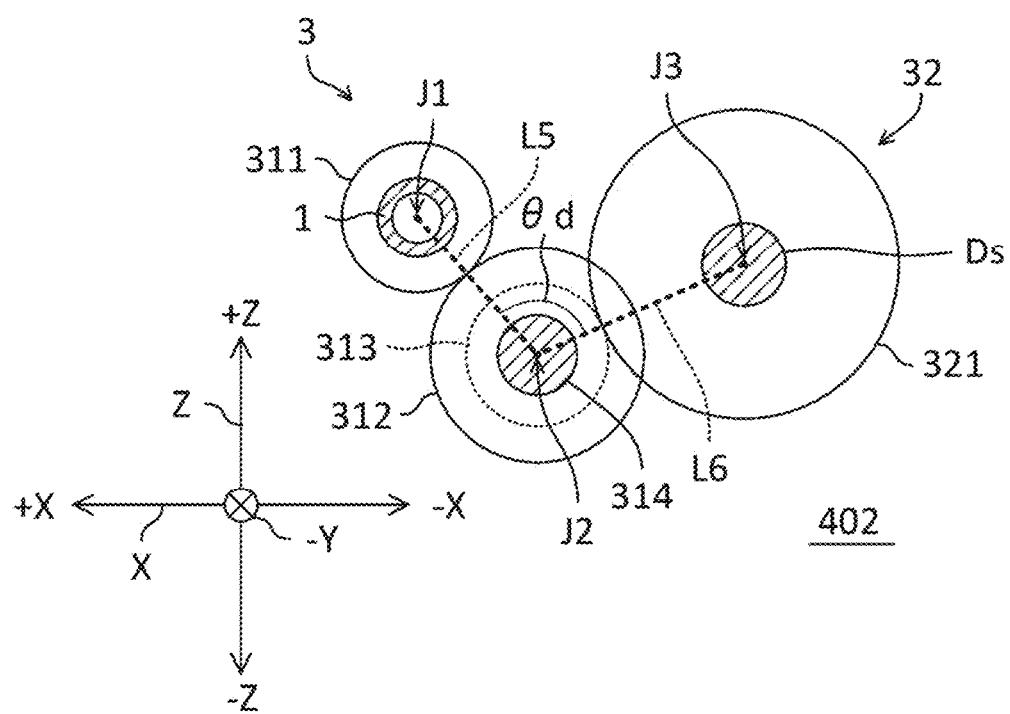
FIG. 7 is a conceptual diagram illustrating a disposition example of an intermediate axis.

Preferably, the intermediate axis J2 is disposed on the −X direction side from the rotation axis J1 and on the +X direction side from a differential axis J3, and is disposed on the −Z direction side from the rotation axis J1 and the differential axis J3. FIG. 7 is a conceptual diagram illustrating a disposition example of the intermediate axis J2. Note that, in FIG. 7, the disposition of the intermediate axis J2 is seen from the +Y direction toward the −Y direction. When viewed from the Y-axis direction, a minimum fourth angle θd formed by a fifth line segment L5 and a sixth line segment L6 is an obtuse angle. Note that, the fifth line segment L5 is a virtual line segment connecting the intermediate axis J2 and the rotation axis J1. The sixth line segment L6 is a virtual line segment connecting the intermediate axis J2 and the differential axis J3. The intermediate axis J2 can be brought closer to the rotation axis J1 and the differential axis J3 in the Z-axis direction by disposing the intermediate axis J2 between the rotation axis J1 and the differential axis J3 in the X-axis direction and on the −Z direction side from the differential axis J3 and setting the fourth angle θd as the obtuse angle. Accordingly, it is possible to further narrow an interval between the intermediate axis J2 and the rotation axis J1 and the differential axis J3 in the Z-axis direction. Thus, since a size of the gear portion 3 in the Z-axis direction can be smaller, the drive device 100 can be further downsized in the Z-axis direction. However, the example of FIG. 7 does not exclude a configuration in which the intermediate axis J2 is disposed on the +X direction side from the rotation axis J1, a configuration in which the intermediate axis J2 is disposed on the −X direction side from the differential axis J3, and a configuration in which the intermediate axis J2 is not disposed on the −Z direction side from the differential axis J3.

The intermediate shaft 314 extends along the intermediate axis J2 extending in the Y-axis direction and is rotatable about the intermediate axis J2. The intermediate axis J2 is, for example, parallel to the rotation axis J1. The intermediate driven gear 312 and the final drive gear 313 are disposed on an outer peripheral surface of the intermediate shaft 314. At least one of the intermediate driven gear 312 and the final drive gear 313 may be the same member as the intermediate shaft 314 or may be a member different from the intermediate shaft 314. In the latter case, at least one of the intermediate driven gear 312 and the final drive gear 313 is firmly fixed to the intermediate shaft 314 by shrink fitting or the like.

The torque of the first shaft 210 is transmitted to the main drive gear 311 via the second shaft 310, and is further transmitted from the main drive gear 311 to the intermediate driven gear 312. The torque transmitted to the intermediate driven gear 312 is transmitted to the final drive gear 313 via the intermediate shaft 314. Furthermore, the torque is transmitted from the final drive gear 313 to the ring gear 321 of the differential 32.

The differential 32 is attached to the output shafts Ds. As described above, the gear portion 3 has the differential 32. The differential 32 has the ring gear 321. The ring gear 321 is rotatable about the differential axis J3 extending in the Y-axis direction. In the present embodiment, the differential axis J3 is disposed on the −X direction side and the −Z direction side from the rotation axis J1. Note that, the X-axis direction is perpendicular to the Y-axis direction. The Z-axis direction is perpendicular to the Y-axis direction and the X-axis direction. The ring gear 321 transmits the torque transmitted from the motor portion 2 to the differential 32 via the reduction gear 31 to the output shafts Ds. The output shafts Ds are attached to the +Y direction side and the −Y direction side of the differential 32. Driving wheels of the vehicle 300 are attached to the output shafts Ds. The differential 32 transmits the torque to the output shafts Ds while absorbing a difference in rotational speed between the output shafts Ds on the +Y direction side and the −Y direction side when, for example, the vehicle 300 is turning.

Next, details of the housing 4 will be described with reference to FIGS. 1 to 5. The housing 4 accommodates the motor shaft 1. In addition, the housing 4 further accommodates the motor portion 2 and the gear portion 3. As described above, the drive device 100 includes the housing 4. Specifically, the housing 4 has a motor accommodation portion 401 that accommodates the motor portion 2 and a gear accommodation portion 402 that accommodates the gear portion 3. The motor accommodation portion 401 is a space surrounded by the housing tubular portion 41, the partition wall 42, and a motor side lid portion 44, and accommodates the rotor 21 and the stator 22. The gear accommodation portion 402 is a space surrounded by the partition wall 42 and a gear side lid portion 43, and accommodates the reduction gear 31, the differential 32, and the like.

A fluid reservoir P in which the fluid F is reserved is disposed in a lower portion in the gear accommodation portion 402. A portion of the differential 32 soaks in the fluid reservoir P. The fluid F reserved in the fluid reservoir P is scraped up by an operation of the differential 32 and is supplied to the inside of the gear accommodation portion 402. For example, in the present embodiment, a portion of the ring gear 321 on the −Z direction side is disposed inside the fluid reservoir P on the −Z direction side of the gear accommodation portion 402 (see FIG. 1). The fluid F is scraped up by a tooth surface of the ring gear 321 when the ring gear 321 of the differential 32 rotates. A part of the scraped fluid F is supplied to each gear and each bearing of the reduction gear 31 and the differential 32 in the gear accommodation portion 402 and is used for lubrication and cooling at a supply destination.

The housing 4 has the housing tubular portion 41 having the tubular shape, the partition wall 42, the motor side lid portion 44, and the gear side lid portion 43. Note that, in the present embodiment, these portions are formed by using metal materials such as iron, aluminum, and an alloy thereof. In addition, in order to suppress contact corrosion of dissimilar metals at the contact portion, these portions are preferably formed by using the same material. However, the present invention is not limited to this example, and these materials may be formed using materials other than metal materials, or at least a part of these materials may be formed using different materials.

The housing tubular portion 41 extends in the Y-axis direction, and accommodates the motor portion 2. As described above, the housing 4 has the housing tubular portion 41. The motor portion 2, a fluid supply member 762 to be described later, and the like are disposed inside the housing tubular portion 41. In addition, the stator core 221 is fixed to the inner surface of the housing tubular portion 41.

The partition wall 42 expands in a direction intersecting with the rotation axis J1. As described above, the housing 4 has the partition wall 42. The partition wall 42 closes an end portion of the housing tubular portion 41 on the +Y direction side. In the present embodiment, the partition wall 42 expands in a direction perpendicular to the Y-axis direction. In addition, the housing tubular portion 41 and the partition wall 42 are different parts of the same member. Rigidity of the housing tubular portion and the partition wall can be enhanced by integrally forming the housing tubular portion and the partition wall. However, the present invention is not limited to this example, and the housing tubular portion 41 and the partition wall 42 may be separate members.

The partition wall 42 has a partition wall through-hole 4201 into which the motor shaft 1 is inserted, a first output shaft through-hole 4202, and an opening portion 4203. Each of the partition wall through-hole 4201, the first output shaft through-hole 4202, and the opening portion 4203 penetrates the partition wall 42 in the Y-axis direction. A center of the partition wall through-hole 4201 coincides with the rotation axis J1. The motor shaft 1 is inserted into the partition wall through-hole 4201. A center of the first output shaft through-hole 4202 coincides with the differential axis J3. The output shaft Ds on the −Y direction side is inserted into the first output shaft through-hole 4202. An oil seal (not illustrated) for sealing the output shaft and the first output shaft through-hole is disposed in a gap between the output shaft Ds and the first output shaft through-hole 4202. Note that, the term "seal" means that different members are in close contact with each other to such an extent that the fluid F inside the members does not leak to the outside and to such an extent that foreign matters such as external water, dust, and dust do not invade. It is assumed that the same configuration is applied below for the sealing. The opening portion 4203 is disposed on the −Z direction side of the partition wall 42, and connects the motor accommodation portion 401 and the gear accommodation portion 402. The fluid F flowing down to the −Z direction side of the motor accommodation portion 401 flows from the opening portion 4203 to the gear accommodation portion 402, lubricates and cools a part of the gear portion 3, and then is reserved in the fluid reservoir P.

In addition, the partition wall 42 further has a first motor bearing holding portion 421, a first gear bearing holding portion 422, a first intermediate bearing holding portion 423, and a first output bearing holding portion 424.

The first motor bearing holding portion 421 is disposed on an end face of the partition wall 42 on the −Y direction side. The first motor bearing holding portion 421 is disposed along an outer edge portion of an end portion of the partition wall through-hole 4201 on the −Y direction side. The housing 4 has the first motor bearing holding portion 421. The first motor bearing holding portion 421 rotatably holds the end portion of the first shaft 210 on the +Y direction side via the first motor bearing 4211. Note that, the first motor bearing holding portion 421 is an example of a "bearing holding portion" of the present invention and the first motor bearing 4211 is an example of a "bearing" of the present invention.

The first gear bearing holding portion 422, the first intermediate bearing holding portion 423, and the first output bearing holding portion 424 are disposed on the end face of the partition wall 42 on the +Y direction side. The first gear bearing holding portion 422 is disposed along an outer edge portion of an end portion of the partition wall through-hole 4201 on the +Y direction side, and rotatably holds the end portion of the second shaft 310 on the −Y direction side via the first gear bearing 4221. The first intermediate bearing holding portion 423 rotatably holds an end portion of the intermediate shaft 314 on the −Y direction side via the first intermediate bearing 4231. The first output bearing holding portion 424 is disposed along an outer edge of an end portion of the first output shaft through-hole 4202 on the +Y direction side, and rotatably holds the output shaft Ds on the −Y direction side via the first output bearing 4241.

In addition, the partition wall 42 has a third flow path 73 to be described later of the fluid flow path 7. The third flow path 73 will be described later.

The gear side lid portion 43 is a covered member having a tubular shape. A lid portion (reference numeral is omitted) of the gear side lid portion 43 expands in a direction intersecting with the rotation axis J1. A tubular portion (reference numeral is omitted) of the gear side lid portion 43 extends in the Y-axis direction. As described above, the housing 4 has the gear side lid portion 43. The gear side lid portion 43 is disposed at an end portion of the partition wall 42 on the +Y direction side, and constitutes the gear accommodation portion 402 that accommodates the gear portion 3 in cooperation with the partition wall 42.

The gear side lid portion 43 is detachably attached to the end portion of the partition wall 42 on the +Y direction side. The attachment of the gear side lid portion 43 to the partition wall 42 can be, for example, fixing with a screw, but is not limited thereto, and a method for firmly fixing the gear side lid portion 43 to the partition wall 42 such as screwing or press-fitting can be widely adopted. As a result, the gear side lid portion 43 can be in close contact with the partition wall 42. Note that, the term "close contact" means sealability to an extent that the fluid F inside the member does not leak to the outside and to an extent that foreign matters such as external water, dirt, and dust do not invade. It is assumed that the same configuration is applied below for the close contact.

The gear side lid portion 43 has a second output shaft through-hole 4301. A center of the second output shaft through-hole 4301 coincides with the differential axis J3. The output shaft Ds on the +Y direction side is inserted into the second output shaft through-hole 4301. An oil seal (not illustrated) for sealing the output shaft and the second output shaft through-hole is disposed in a gap between the output shaft Ds and the second output shaft through-hole 4301.

In addition, the gear side lid portion 43 further has the second gear bearing holding portion 431, a second intermediate bearing holding portion 432, and a second output bearing holding portion 433. The second gear bearing holding portion 431, the second intermediate bearing holding portion 432, and the second output bearing holding portion 433 are disposed on the −Y direction side of the gear side lid portion 43. The second gear bearing holding portion 431 rotatably holds an end portion of the second shaft 310 on the +Y direction side via the second gear bearing 4311. The second intermediate bearing holding portion 432 rotatably holds an end portion of the intermediate shaft 314 on the +Y direction side via the second intermediate bearing 4321. The second output bearing holding portion 433 is disposed along an outer edge of an end portion of the second output shaft through-hole 4301 on the −Y direction-side, and rotatably holds the output shaft Ds on the +Y direction side via the second output bearing 4331.

In addition, the gear side lid portion 43 has a tray portion 434 (see, for example, FIG. 1). The tray portion 434 is disposed on the −Y direction side of the gear side lid portion 43 and has a recessed portion (reference numeral is omitted) recessed in the −Z direction (vertically downward) and one or a plurality of hole portions 4341. The hole portion 4341 penetrates the tray portion 434. The fluid F scraped up by the ring gear 321 is reserved in the tray portion 434, flows out through the hole portion 4341, is supplied to each gear, bearing, and the like in the gear accommodation portion 402, and lubricates or cools the gear, the bearing, and the like.

In addition, the gear side lid portion 43 has a fifth flow path 75 to be described later of the fluid flow path 7. The fifth flow path 75 will be described later.

The motor side lid portion 44 is detachably attached to an end portion of the housing tubular portion 41 on the −Y direction side, and closes and blocks the end portion of the housing tubular portion 41 on the −Y direction side. The fixing of the motor side lid portion 44 to the housing tubular portion 41 can be performed by, for example, a screw, but is not limited thereto, and firm fixing means such as screwing or press-fitting can be widely adopted. As a result, the motor side lid portion 44 can be brought into close contact with the housing tubular portion 41.

The motor side lid portion 44 has a second motor bearing holding portion 441. The second motor bearing holding portion 441 is disposed on the +Y direction side of the motor side lid portion 44. The housing 4 has the second motor bearing holding portion 441. The second motor bearing holding portion 441 rotatably holds an end portion of the first shaft 210 on the −Y direction side via the second motor bearing 4411. Note that, the second motor bearing holding portion 441 is another example of the "bearing holding portion" of the present invention, and the second motor bearing 4411 is another example of the "bearing" of the present invention.

Next, the pump 5, the cooler 6, and the fluid flow path 7 will be described with reference to FIGS. 1 to 5. As described above, the drive device 100 includes the pump 5, the cooler 6, and the fluid flow path 7. The pump 5 delivers the fluid F within the housing 4. The cooler 6 cools the fluid F. The fluid F flows through the fluid flow path 7.

The pump 5 is an electric pump driven by an inverter unit (not illustrated). A trochoidal pump, a centrifugal pump, or the like can be adopted as the pump 5. The pump 5 is fixed to the housing tubular portion 41. For example, as illustrated in FIG. 4, the pump 5 has a plurality of fixing portions 50 fixed to the housing tubular portion 41. The fixing portions 50 are disposed along an outer edge portion of the pump 5 viewed from the Y-axis direction. A through-hole (reference numeral is omitted) extending in the Y-axis direction is formed in the fixing portion 50. A bolt extending in the Y-axis direction is inserted into the through-hole. The pump 5 is fixed to the housing 4 by screwing this bolt into, for example, the housing tubular portion 41 of the housing 4. Here, a third line segment L3 is a virtual line segment connecting the two protrusion portions 223 disposed at the position closest to the pump 5 when viewed in the Y-axis direction. A fourth line segment L4 is a virtual line segment connecting the two fixing portions 50 disposed at the position closest to the stator 22 when viewed from the Y-axis direction. At this time, preferably, the third line segment L3 is parallel to the fourth line segment L4 when viewed from the Y-axis direction. By doing this, since the protrusion portion 223 of the stator 22 and the fixing portion 50 of the pump 5 are not disposed between the third line segment L3 and the fourth line segment L4 when viewed in the Y-axis direction, an interval between the stator 22 and the pump 5 in the radial direction can be further reduced. Accordingly, the drive device 100 can be further downsized.

In addition, as illustrated in FIG. 4, the pump 5 is disposed on the −X direction side from the rotation axis J1 and on the +X direction side from the differential axis J3. In addition, in the present embodiment, the pump 5 is disposed on the −Z direction side from the differential axis J3. The pump 5 is disposed between the rotation axis J1 of the motor shaft 1 and the differential axis J3 of the ring gear 321 (or the output shaft Ds) in the X-axis direction, and thus, an inlet (that is, one end portion of the first flow path 71 to be described later) of a strainer of the pump 5 is easily disposed at a center of the gear accommodation portion 402 that accommodates the gear portion 3 in the X-axis direction. Accordingly, for example, even though the drive device 100 is inclined about the Y-axis direction, the inlet (one end portion of the first flow path 71) of the strainer of the pump 5 is hardly separated from a liquid level of the fluid reservoir P on the −Z direction side of the gear accommodation portion 402. Accordingly, even when the drive device 100 is inclined, the pump 5 can continue to suck the fluid F from the fluid reservoir P.

The fluid flow path 7 supplies a part of the fluid F reserved in the fluid reservoir P of the gear accommodation portion 402 to the inside of the motor shaft 1, and supplies the other part to the outside of the motor portion 2. The pump 5 and the cooler 6 are disposed in the middle of the fluid flow path 7. That is, the fluid F sucked by the pump 5 is supplied to the inside of the motor shaft 1 and the outside of the motor portion 2 after passing through the cooler 6.

The fluid flow path 7 has a first flow path 71, a second flow path 72, a third flow path 73, a fourth flow path 74, a fifth flow path 75, and a sixth flow path 76. The first flow path 71 connects the gear accommodation portion 402 and a first inlet 51 of the pump 5. The second flow path 72 connects a first outlet 52 of the pump 5 and one end portion of the third flow path 73 via the cooler 6. The third flow path 73 is disposed inside the partition wall 42 and extends in a direction intersecting with the rotation axis J1. The fourth flow path 74 connects the other end portion of the third flow path 73 and one end portion of the fifth flow path 75. The fifth flow path 75 is formed inside the gear side lid portion 43. The other end portion of the fifth flow path 75 is connected to the end portion of the second shaft 310 on the +Y direction side. One end portion of the sixth flow path 76 is connected to the other end portion of the third flow path 73. The other end portion of the sixth flow path 76 is disposed inside the housing tubular portion 41.

By doing this, the fluid F delivered from the pump 5 and flowing through the third flow path 73 can be supplied to the inside of the motor portion 2 through the fourth flow path 74, the fifth flow path 75, the inside of the second shaft 310 and the inside of the first shaft 210, and can be supplied to the outside of the motor portion 2 (for example, the stator 22) through the sixth flow path 76. That is, the fluid F can be supplied to the inside and the outside of the motor portion 2 through, for example, different flow paths such as the fourth flow path 74, the fifth flow path 75, and the sixth flow path 76 by using the same pump 5. Accordingly, since it is not necessary to mount the plurality of pumps 5, the drive device 100 can be further downsized. Since the manufacturing cost and the number of manufacturing processes can be reduced, the productivity of the drive device 100 can be improved. Since the fourth flow path 74 and the sixth flow path 76 for supplying the fluid F to the inside and the outside of the motor portion 2 branch at the other end portion of the third flow path 73, the fluid flow path 7 can be simplified. The cooled fluid F can be supplied to the inside and the outside of the motor portion 2 through a shorter path by connecting the second flow path 72 passing through the cooler 6 to one end portion of the third flow path 73 inside the partition wall 42.

The first inlet 51 of the pump 5 is inserted into one end portion of the first flow path 71. A strainer is connected to the other end portion of the first flow path 71. The strainer is disposed in the −Z direction from the differential axis J3, and is disposed in the −Z direction from the liquid level of the fluid reservoir P. In the present embodiment, the strainer is disposed in the fluid reservoir P of the gear accommodation portion 402. Specifically, the inlet (not illustrated) of the strainer is disposed in the −Z direction (that is, vertically downward) from the liquid level of the fluid reservoir P. As a result, it is possible to prevent air from flowing into the first flow path 71. Since the first flow path 71 can be shortened by disposing the strainer in the −Z direction from the differential axis J3, a flow path resistance acting on the fluid F flowing in the first flow path 71 can be reduced. The fluid F is sucked from the inlet of the strainer by driving of the pump 5, is supplied to the first inlet 51 of the pump 5 through the first flow path 71, and is sucked by the pump 5. A filtration structure (not illustrated) such as a filter is attached to the strainer. It is possible to suppress mixing of foreign matters into the pump 5 and the motor portion 2 by attaching the filtration structure.

The second flow path 72 is disposed radially outward of the motor accommodation portion 401 and connects the pump 5 and the cooler 6.

Figure 8:
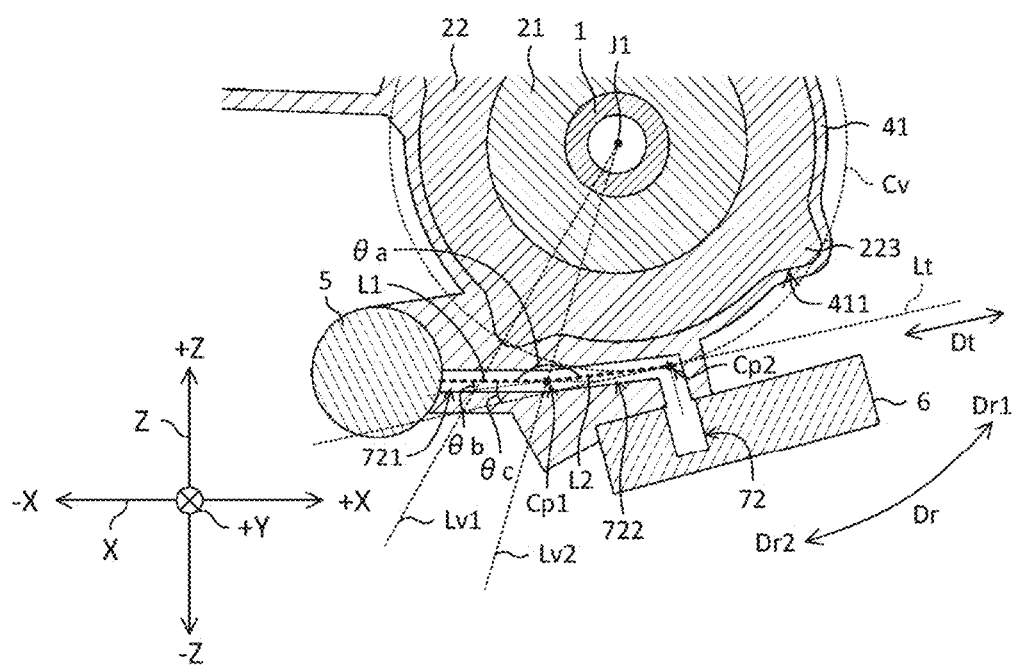
FIG. 8 is an enlarged view of a second flow path.

FIG. 8 is an enlarged view of the second flow path 72. Note that, FIG. 8 is an enlarged view of a portion D surrounded by a broken line in FIG. 4. One end portion of the second flow path 72 is connected to a first outlet 52 of the pump 5. The pump 5 delivers the fluid F sucked from the first inlet 51 from the first outlet 52 and delivers the fluid F to the cooler 6 via the second flow path 72.

The second flow path 72 passes through the inside of the cooler 6 and is connected to the third flow path 73. A refrigerant RE such as water supplied from the outside is supplied to the cooler 6 through a path different from the second flow path 72. The cooler 6 exchanges heat between the fluid F and the refrigerant RE to lower a temperature of the fluid F flowing through the second flow path 72.

Here, the pump 5 and the cooler 6 are disposed on the radially outer surface of the housing tubular portion 41 and are aligned in the circumferential direction Dr. The cooler 6 is disposed in one circumferential direction Dr1 from the pump 5. By doing this, a flow path between the pump 5 and the cooler 6 can be further shortened. In the present embodiment, the pump 5 is disposed in the other circumferential direction Dr2 side from a first virtual line Lv1 passing through the rotation axis J1 and the radially outer end portion of the protrusion portion 223 when viewed from the Y-axis direction. The cooler 6 is disposed in one circumferential direction Dr1 from the first virtual line Lv1 when viewed in the Y-axis direction. By doing this, since the pump 5 and the cooler 6 are not disposed on the first virtual line Lv1 in the Y direction, an interval in the radial direction between the pump 5 and the cooler 6 and the rotation axis J1 can be further reduced. Accordingly, the drive device 100 can be further downsized. However, the disposition of the pump 5 and the cooler 6 in the circumferential direction is not limited to this example. For example, the cooler 6 may be disposed at the other circumferential direction Dr2 from the pump 5.

More preferably, when viewed from the Y-axis direction, the first virtual line Lv1 intersects with a second virtual line Lv2 from the rotation axis J1 toward a connection portion Cp1 to be described later. Note that, as will be described later, the connection portion Cp1 is a portion where a first fluid passage 721 is connected to a second fluid passage 722. By doing this, since the connection portion Cp1 can be brought closer to the rotation axis J1 in the radial direction, a size of the housing tubular portion 41 in the radial direction can be further reduced. Accordingly, the drive device 100 can be further downsized.

In addition, preferably, as illustrated in FIG. 3, the first inlet 51 of the pump 5 is disposed on the +Y direction side of the pump 5. The first outlet 52 of the pump 5 is disposed on the −Y direction side of the pump 5. A second inlet 61 of the cooler 6 is disposed on the −Y direction side of the cooler 6 and is connected to the first outlet 52 of the pump 5. The second outlet 62 of the cooler 6 is disposed on the +Y direction side of the cooler 6 and is connected to the third flow path 73.

A width of the pump 5 in the circumferential direction Dr can be further reduced by disposing the first inlet 51 on the +Y direction side of the pump 5 and disposing the first outlet 52 on the −Y direction side. In addition, a width of the cooler 6 in the circumferential direction Dr can be further reduced by disposing the second inlet 61 on the −Y direction side of the cooler 6 and disposing the second outlet 62 on the +Y direction side. Accordingly, the pump 5 and the cooler 6 can be disposed more compactly. In addition, a portion of the second flow path 72 connecting the first outlet 52 and the second inlet 61 can be further shortened by connecting the first outlet 52 and the second inlet 61 on the −Y direction side. Accordingly, the flow path connecting the first outlet 52 of the pump 5 and the second inlet 61 of the cooler 6 can be further shortened.

However, the disposition of the first inlet 51 and the first outlet 52 of the pump 5 and the second inlet 61 and the second outlet 62 of the cooler 6 is not limited to the above-described example. That is, the above-described example does not exclude a configuration in which the first inlet 51 is not disposed on the +Y direction side of the pump 5, a configuration in which the first outlet 52 is not disposed on the −Y direction side of the pump 5, a configuration in which the second inlet 61 is not disposed on the −Y direction side of the cooler 6, and a configuration in which the second outlet 62 is not disposed on the +Y direction side of the cooler 6.

In addition, preferably, as illustrated in FIG. 3, the second inlet 61 of the cooler 6 is disposed on the −Y direction side of the cooler 6 and on the other circumferential direction Dr2 side. The second outlet 62 of the cooler 6 is disposed on the +Y direction side and one circumferential direction Dr1 side of the cooler 6. By doing this, in the cooler 6, the second inlet 61 and the second outlet 62 can be disposed on a diagonal line in plan view viewed from the radial direction, for example. Accordingly, since the interval between the second inlet 61 and the second outlet 62 can be longer, the portion of the second flow path 72 disposed inside the cooler 6 can be longer. Thus, the fluid F can be sufficiently cooled by the cooler 6. However, the disposition of the second inlet 61 and the second outlet 62 of the cooler 6 is not limited to the above-described example. That is, the above-described example does not exclude a configuration in which the second inlet 61 is not disposed on the −Y direction side and the other circumferential direction Dr2 side of the cooler 6 and a configuration in which the second outlet 62 is not disposed on the +Y direction side and the one circumferential direction Dr1 side of the cooler 6.

Next, the third flow path 73 is formed inside the partition wall 42 as described above. The other end portion of the third flow path 73 is disposed in the +Z direction from one end portion of the third flow path 73. Preferably, the third flow path 73 linearly extends from one end portion toward the other end portion when viewed in the axial direction. By doing this, a flow path length of the third flow path 73 can be further shortened.

As described above, the fourth flow path 74 connects the other end portion of the third flow path 73 and one end portion of the fifth flow path 75. The fourth flow path 74 has a third inlet 741. The third inlet 741 is disposed in the partition wall 42. In other words, the partition wall 42 has the third inlet 741. The third inlet 741 is a hole extending in the −Y direction from the end face of the partition wall 42 on the +Y direction side, and connects the other end portion of the third flow path 73 and one end portion of the fourth flow path 74.

In addition, the fourth flow path 74 has a third outlet 742. The third outlet 742 of the fourth flow path 74 is disposed in the gear side lid portion 43. In other words, the gear side lid portion 43 has the third outlet 742. The third outlet 742 connects the other end portion of the fourth flow path 74 and one end portion of the fifth flow path 75.

In addition, the fourth flow path 74 has a tank 8. The tank 8 will be described later.

Next, the fifth flow path 75 is formed inside the gear side lid portion 43 as described above. The other end portion of the fifth flow path 75 is connected to the second gear bearing holding portion 431. The lubrication and cooling of the second gear bearing 4311 are performed by a part of the fluid F flowing into the second gear bearing holding portion 431 through the fifth flow path 75. In addition, the other part of the fluid F flowing into the second gear bearing holding portion 431 through the fifth flow path 75 flows into the motor shaft 1 from the end portion of the second shaft 310 on the +Y direction side and is supplied to the motor portion 2 side.

Here, a supply restricting member 751 is disposed on the second gear bearing holding portion 431. In other words, the housing 4 has the supply restricting member 751. The supply restricting member 751 restricts the amount of fluid F supplied from the fifth flow path 75 to the second gear bearing 4311. The fluid F supplied from the fifth flow path 75 to the motor portion 2 side through the second hollow portion 3102 of the second shaft 310 can be secured due to this restriction. The supply restricting member 751 has an annular portion (reference numeral is omitted) facing the second gear bearing 4311 in the Y-axis direction and a tubular portion (reference numeral is omitted) which extends from a radially inner end portion of the annular portion in the −Y direction and is inserted into the end portion of the second shaft 310 on the +Y direction side. The annular portion has a through-hole (reference numeral is omitted) that penetrates the annular portion in the Y-axis direction. The fluid F is supplied to the second gear bearing 4311 through the through-hole and is supplied to the inside of the second shaft 310 through the tubular portion.

Next, the sixth flow path 76 has an internal flow path 761. The internal flow path 761 is a flow path of the fluid F formed inside the partition wall 42. One end portion of the internal flow path 761 is connected to the other end portion of the third flow path 73. The other end portion of the internal flow path 761 is opened on the end face of the partition wall 42 on the −Y direction-side. In the present embodiment, the internal flow path 761 is a portion on one end portion side of the sixth flow path 76.

In addition, the sixth flow path 76 further has the fluid supply member 762. The fluid supply member 762 is disposed radially outward of the stator 22 to supply the fluid F to the stator 22. In the present embodiment, the fluid supply member 762 is a portion on the other end portion side of the sixth flow path 76. The fluid supply member 762 is accommodated in the motor accommodation portion 401. An end portion of the fluid supply member 762 on the +Y direction side is connected to the other end portion of the internal flow path 761. An end portion of the fluid supply member 762 on the −Y direction side is fixed to the motor side lid portion 44.

In the present embodiment, the fluid supply member 762 has a tubular shape extending in the Y-axis direction. However, the present invention is not limited to this example, and the fluid supply member 762 may have a tray shape having a recess portion recessed in the −Z direction (vertically downward) and opened in the +Z direction (vertically upward). The fluid F supplied from the third flow path 73 to the sixth flow path 76 flows inside the fluid supply member 762.

The fluid supply member 762 has at least one supply hole 763. The supply hole 763 is opened toward at least one of the stator 22, the first motor bearing 4211, and the second motor bearing 4411. The supply hole 763 is a hole penetrating the fluid supply member 762. For example, in the present embodiment, a plurality of supply holes 763 are aligned in the Y-axis direction. The supply hole 763 disposed closest to the +Y direction side is opened toward the first motor bearing 4211. The supply hole 763 disposed closest to the −Y direction side is opened toward the second motor bearing 4411. In the Y-axis direction, the supply hole 763 disposed therebetween is opened toward the radially outer surface of the stator 22 and the end portion (for example, the coil end 2221) of the stator 22 in the Y-axis direction. By doing this, the fluid F flowing out of the supply hole 763 can be supplied to at least one of the stator 22, the first motor bearing 4211, and the second motor bearing 4411 through the supply hole 763. Accordingly, these components can be cooled and lubricated.

Here, the fluid flow path 7 is branched into the fourth flow path 74 and the sixth flow path 76 at the other end portion of the third flow path 73. Preferably, a minimum flow path cross-sectional area in the fourth flow path 74 is narrower than a minimum flow path cross-sectional area in the sixth flow path 76. In addition, a minimum flow path cross-sectional area in the third flow path 73 is wider than a minimum flow path cross-sectional area in the sixth flow path 76. For example, a diameter of the third inlet 741 of the fourth flow path 74 is smaller than a smaller inner diameter of an inner diameter of the internal flow path 761 and an inner diameter of the fluid supply member 762 in the sixth flow path 76. In addition, an inner diameter of the third flow path 73 is larger than a smaller inner diameter of an inner diameter of the internal flow path 761 and an inner diameter of the fluid supply member 762 in the sixth flow path 76. A decrease in a flow pressure of the fluid F flowing through the third flow path 73 can be reduced by setting the minimum flow path cross-sectional area in the fourth flow path 74 to be narrower than that in the sixth flow path 76. Accordingly, for example, even though the fluid supply member 762 is located in the +Z direction (vertically upward) from the third inlet 741 of the fourth flow path 74 or the viscosity of the fluid F is high, the fluid F can be sufficiently supplied to the fluid supply member 762 through the sixth flow path 76. However, this example does not exclude a configuration in which the minimum flow path cross-sectional area in the fourth flow path 74 is not narrower than the minimum flow path cross-sectional area in the sixth flow path 76 and a configuration in which the minimum flow path cross-sectional area in the third flow path 73 is not wider than the minimum flow path cross-sectional area in the sixth flow path 76.

Figure 9:
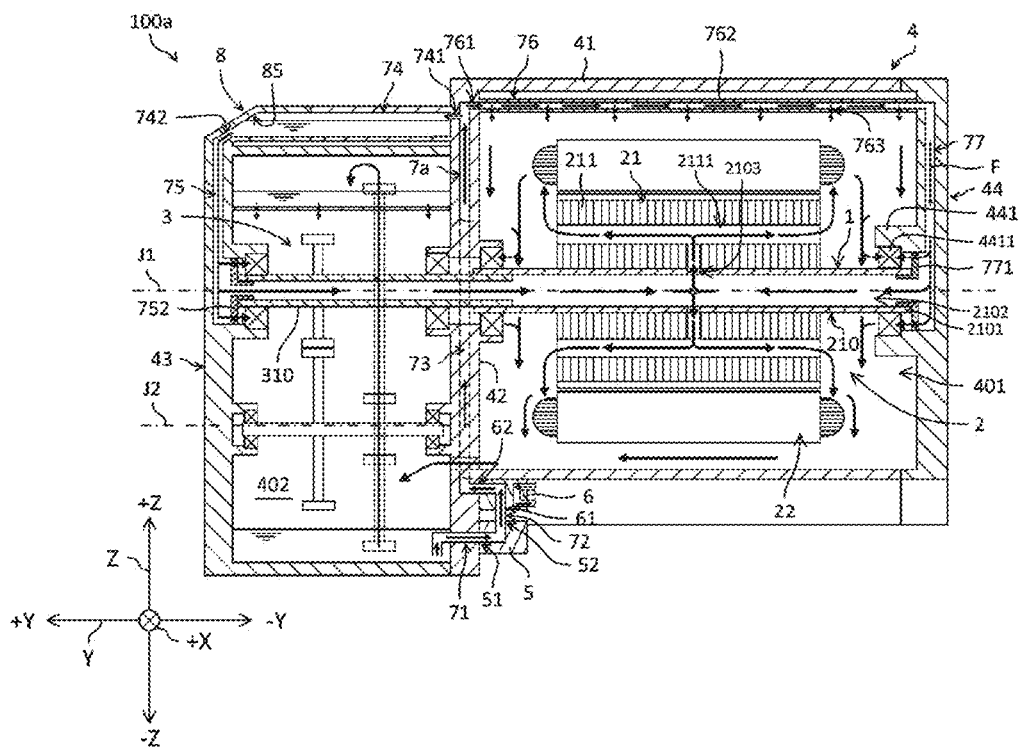
FIG. 9 is a schematic diagram illustrating a modification example of the drive device viewed from the X-axis direction.

In addition, the fluid flow path 7 may further include a flow path for supplying the fluid F flowing through the sixth flow path 76 to an end portion of the motor shaft 1 on the −Y direction side. FIG. 9 is a schematic view of a modification example of the drive device 100 viewed from the X-axis direction. Note that, FIG. 9 illustrates a configuration of a drive device 100a according to the modification example viewed from the −X direction toward the +X direction. In addition, FIG. 1 is merely a conceptual diagram, and the layout and dimensions of each portion are not necessarily the same as those of the actual drive device 100a.

In FIG. 9, a fluid flow path 7a further includes a seventh flow path 77. An end portion of the sixth flow path 76 on the −Y direction side is connected to one end portion of the seventh flow path 77. The other end portion of the seventh flow path 77 is connected to the end portion of the first shaft 210 on the +Y direction side. Specifically, the seventh flow path 77 is disposed inside the motor side lid portion 44 and is connected to the second motor bearing holding portion 441. In other words, the motor side lid portion 44 has the seventh flow path 77. The other part of the fluid F flowing from the sixth flow path 76 to the seventh flow path 77 is supplied to the second motor bearing 4411 and the second motor bearing 4411 is lubricated and cooled. In addition, the other end portion of the seventh flow path 77 is connected to the end portion of the first shaft 210 on the −Y direction side via the second motor bearing holding portion 441. The other part of the fluid F flowing from the sixth flow path 76 to the seventh flow path 77 is supplied to the inside of the motor portion 2 via the second motor bearing holding portion 441. By doing this, the fluid F passing through the sixth flow path 76 and the seventh flow path 77 can also be supplied in the −Y direction of the first shaft 210. Accordingly, a larger amount of fluid F can be sufficiently supplied to the inside of the motor portion 2.

In addition, in FIG. 9, a supply restricting member 771 is disposed in the second motor bearing holding portion 441. In other words, the housing 4 has the supply restricting member 771. The supply restricting member 771 restricts the amount of fluid F supplied from the seventh flow path 77 to the second motor bearing 4411. The fluid F supplied from the seventh flow path 77 to the inside of the motor portion 2 through the first hollow portion 2102 of the first shaft 210 can be secured due to this restriction. The supply restricting member 771 has an annular portion (reference numeral is omitted) facing the second motor bearing 4411 in the Y-axis direction and a tubular portion (reference numeral is omitted) which extends from a radially inner end portion of the annular portion in the −Y direction and is inserted into the end portion of the first shaft 210 on the −Y direction side. The annular portion has a through-hole (reference numeral is omitted) that penetrates the annular portion in the Y-axis direction. The fluid F is supplied to the second motor bearing 4411 through the through-hole and is supplied to the inside of the first shaft 210 through the tubular portion.

Next, a more detailed configuration of the second flow path 72 will be described with reference to FIGS. 4 and 5 and FIG. 8.

The second flow path 72 includes the first fluid passage 721 and the second fluid passage 722. Each of the first fluid passage 721 and the second fluid passage 722 extends linearly. One end portion of the first fluid passage 721 is connected to the pump 5. The other end portion of the first fluid passage 721 is connected to the second fluid passage 722 and is connected to the cooler 6 via the second fluid passage 722. Specifically, the first fluid passage 721 and the second fluid passage 722 are disposed inside the housing tubular portion 41. The other end portion of the first fluid passage 721 is connected to a portion between both end portions of the second fluid passage 722. The other end portion of the second fluid passage 722 is opened to the radially outer surface of the housing tubular portion 41. In order to prevent leakage of the fluid F, one end portion of the second fluid passage 722 is closed by a seal plug 7221.

In addition, the second flow path 72 includes a third fluid passage 723, a fourth fluid passage 724, and a fifth fluid passage 725. The third fluid passage 723 is disposed inside the housing tubular portion 41 and connects one end portion of the second fluid passage 722 and the second inlet 61 of the cooler 6. The fourth fluid passage 724 is disposed inside the cooler 6 and connects the third fluid passage 723 and the fifth fluid passage 725. In the present embodiment, one end portion of the fourth fluid passage 724 is the second inlet 61, and the other end portion of the fourth fluid passage 724 is the second outlet 62. The fluid F flowing through the fourth fluid passage 724 is cooled by heat exchange with the refrigerant RE of another pipe. The fifth fluid passage 725 is disposed inside the housing tubular portion 41 and connects the second outlet 62 of the cooler 6 and one end portion of the third flow path 73.

When viewed from the Y-axis direction, a direction in which the first fluid passage 721 extends intersects with a direction in which the second fluid passage 722 extends. Here, as illustrated in FIG. 8, a first line segment L1 is a virtual line segment connecting the connection portion Cp1 between the first fluid passage 721 and the second fluid passage 722 and one end portion of the first fluid passage 721. A second line segment L2 is a virtual line segment connecting the connection portion Cp1 and the end portion of the second fluid passage 722 on the cooler 6 side. At this time, a minimum first angle θa formed by the first line segment L1 and the second line segment L2 faces the rotation axis J1 when viewed from the Y-axis direction.

Since the direction in which the first fluid passage 721 extends and the direction in which the second fluid passage 722 extends intersect with each other, the minimum first angle θa formed by the first line segment L1 and the second line segment L2 is larger than 0 degrees and smaller than 180 degrees. The first angle θa faces the rotation axis J1 when viewed from the Y-axis direction. As a result, a width between a radially inner end portion and a radially outer end portion of a space occupied by the first fluid passage 721 and the second fluid passage 722 can be further reduced. Accordingly, the size of the housing tubular portion 41 in the radial direction can be further reduced. In addition, the pump 5 and the cooler 6 aligned in the circumferential direction can be disposed radially inward. Accordingly, the drive device 100 can be further downsized.

Preferably, the first angle θa is an obtuse angle when viewed in the Y-axis direction (see FIG. 8). The first fluid passage 721 and the second fluid passage 722 can be brought closer to the motor accommodation portion 401 in the radial direction by setting the first angle θa to the obtuse angle. Note that, when the first fluid passage 721 and the second fluid passage 722 are formed inside the housing tubular portion 41, in a case where the first angle θa is an acute angle, it is necessary to further separate the connection portion Cp1 between the first fluid passage 721 and the second fluid passage 722 from the motor accommodation portion 401 in the radial direction. Accordingly, since the size of the housing tubular portion 41 in the radial direction can be reduced, the drive device 100 can be further downsized. In addition, the seal plug 7221 for preventing the leakage of the fluid F is disposed at an end portion of the second fluid passage 722 radially outward. The end portion of the second fluid passage 722 radially outward in the circumferential direction is easily separated from the cooler 6 by setting the first angle θa to the obtuse angle. Accordingly, it is possible to prevent the seal plug 7221 from interfering with the cooler 6 and hindering the disposition of the cooler 6. In addition, since the end portion of the second fluid passage 722 radially outward can be disposed radially inward, an increase in the size of the housing tubular portion 41 in the radial direction can be suppressed. Accordingly, the drive device 100 can be further downsized. However, the above-described example does not exclude a configuration in which the first angle θa is a right angle or an acute angle when viewed from the Y-axis direction.

In addition, preferably, a minimum second angle θb formed by the direction in which the first fluid passage 721 extends and the direction in which the second fluid passage 722 extends is smaller than a minimum third angle θc formed by a tangential direction Dt and the direction in which the first fluid passage 721 extends when viewed in the Y-axis direction (see FIG. 8). Here, the tangential direction Dt is a direction in which a tangent Lt at the end portion of the second fluid passage 722 on the cooler 6 side extends. The tangential direction is a direction in which the tangent Lt extends. The tangent Lt is in contact with a virtual circle Cv when viewed from the Y-axis direction. The virtual circle Cv has the rotation axis J1 as a center and passes through the end portion of the second fluid passage 722 on the cooler 6 side. In other words, the virtual circle Cv passes through a connection portion Cp2 between the second fluid passage 722 and the third fluid passage 723. The tangent Lt is in contact with the virtual circle Cv at the connection portion Cp2 between the second fluid passage 722 and the third fluid passage 723. Since the seal plug 7221 disposed at the end portion of the second fluid passage 722 radially outward is more easily separated from the cooler 6 by setting θb<θc, it is possible to more reliably prevent the end portion of the second fluid passage 722 radially outward from hindering the disposition of the cooler 6. In addition, since the end portion of the second fluid passage 722 radially outward can be disposed radially inward, an increase in the size of the housing tubular portion 41 in the radial direction can be suppressed. Accordingly, the drive device 100 can be further downsized. However, this example does not exclude a configuration in which θb≥θc.

In addition, preferably, at least one of the first fluid passage 721 and the second fluid passage 722 extends in a direction perpendicular to the Y-axis direction. In other words, at least one of the direction in which the first fluid passage 721 extends and the direction in which the second fluid passage 722 extends is parallel to a virtual plane Pv orthogonal to the Y-axis direction. For example, in the present embodiment, as illustrated in FIG. 8, both the direction in which the first fluid passage 721 extends and the direction in which the second fluid passage 722 extends are parallel to the virtual plane Pv. At least one of the first fluid passage 721 and the second fluid passage 722 extends in a direction orthogonal to the Y-axis direction, and thus, at least one thereof can be more easily formed in the housing tubular portion 41. However, this example does not exclude a configuration in which both the direction in which the first fluid passage 721 extends and the direction in which the second fluid passage 722 extends intersect with the virtual plane Pv.

Figure 10:
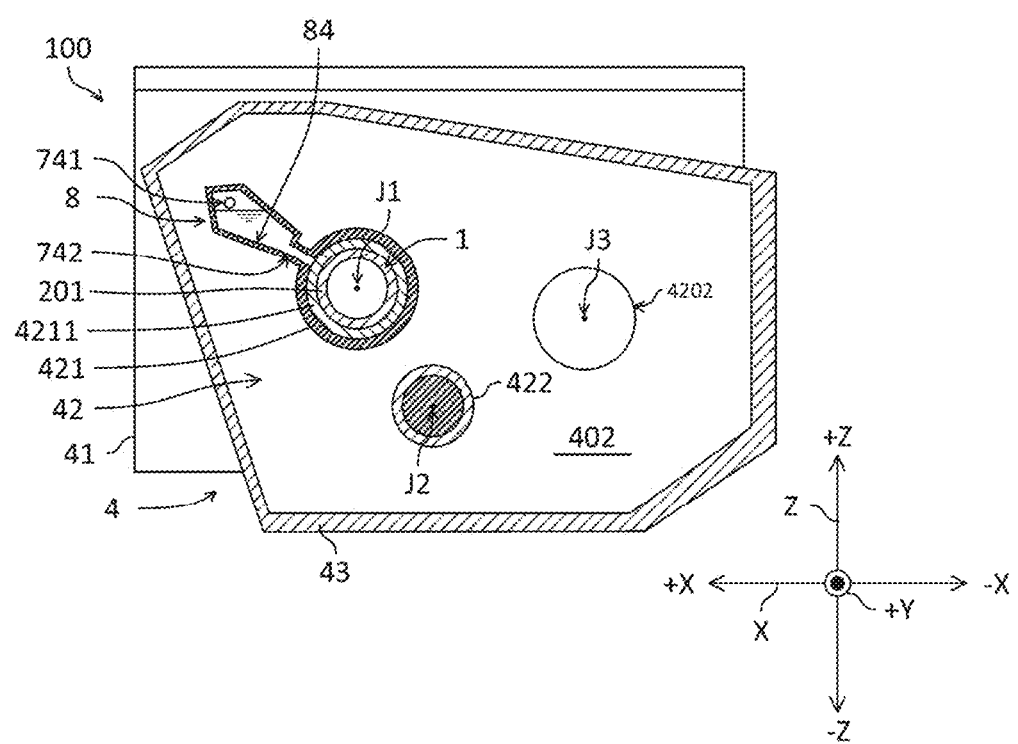
FIG. 10 is a conceptual diagram illustrating the disposition of a tank.
Figure 11:
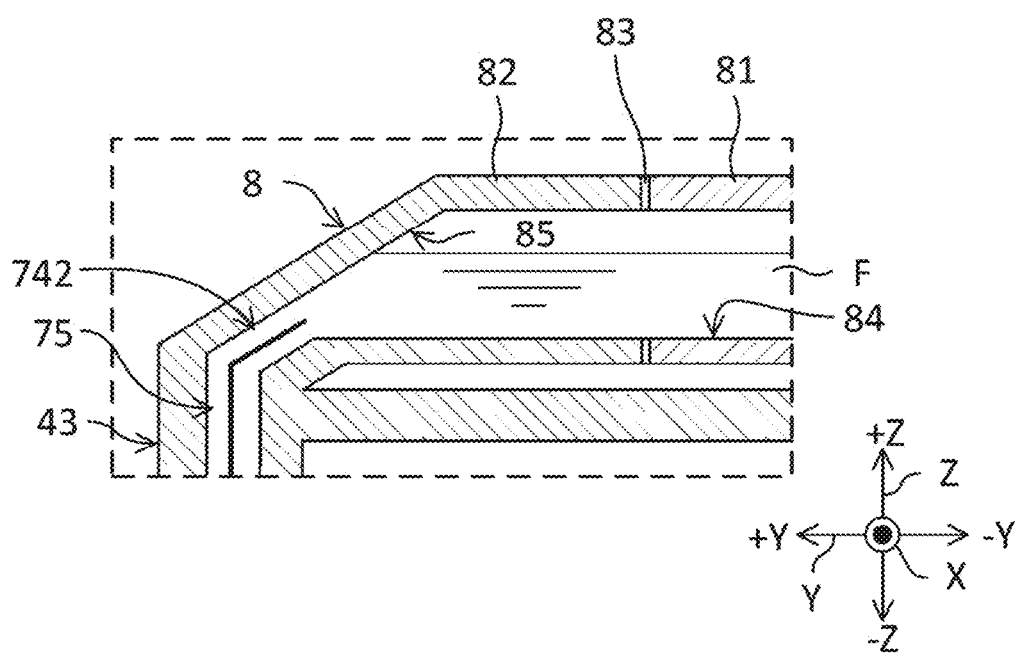
FIG. 11 is an enlarged cross-sectional view illustrating a configuration example of the tank.
Figure 12:
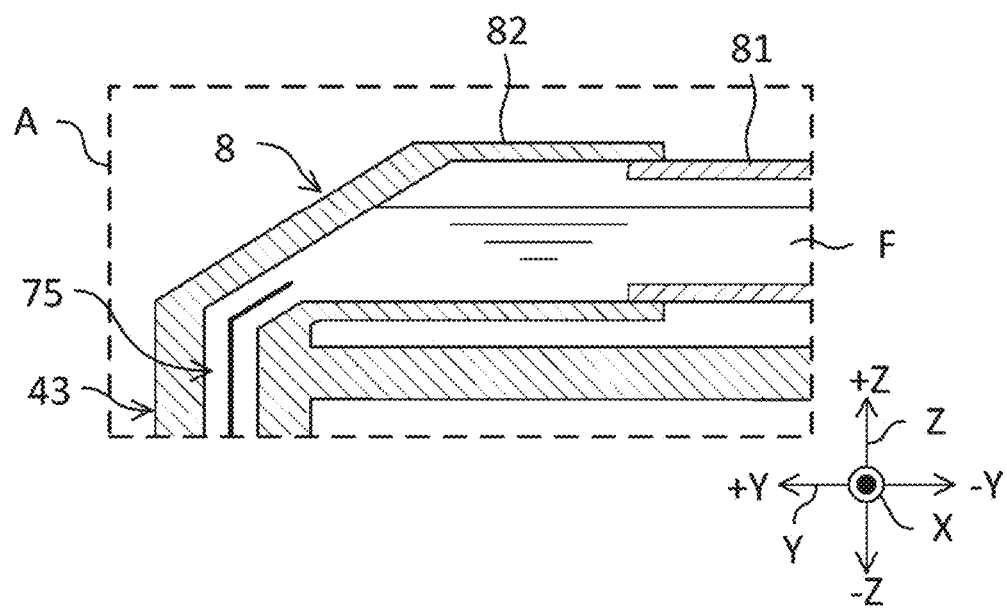
FIG. 12A is an enlarged cross-sectional view illustrating a first modification example of the tank.
FIG. 12B is an enlarged cross-sectional view illustrating a second modification example of the tank.
Figure 12:
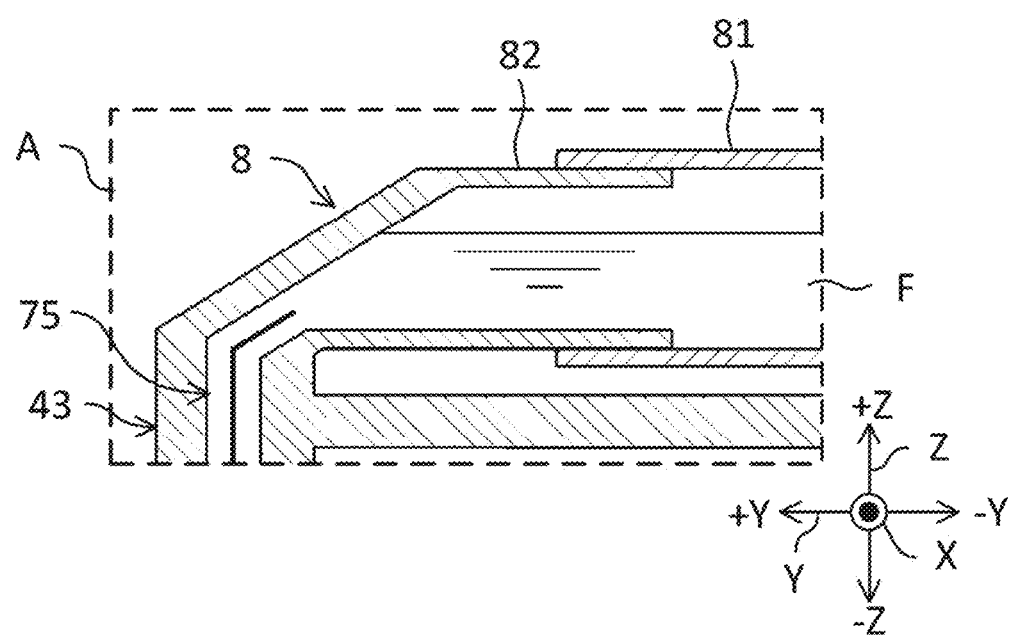
Figure 13:
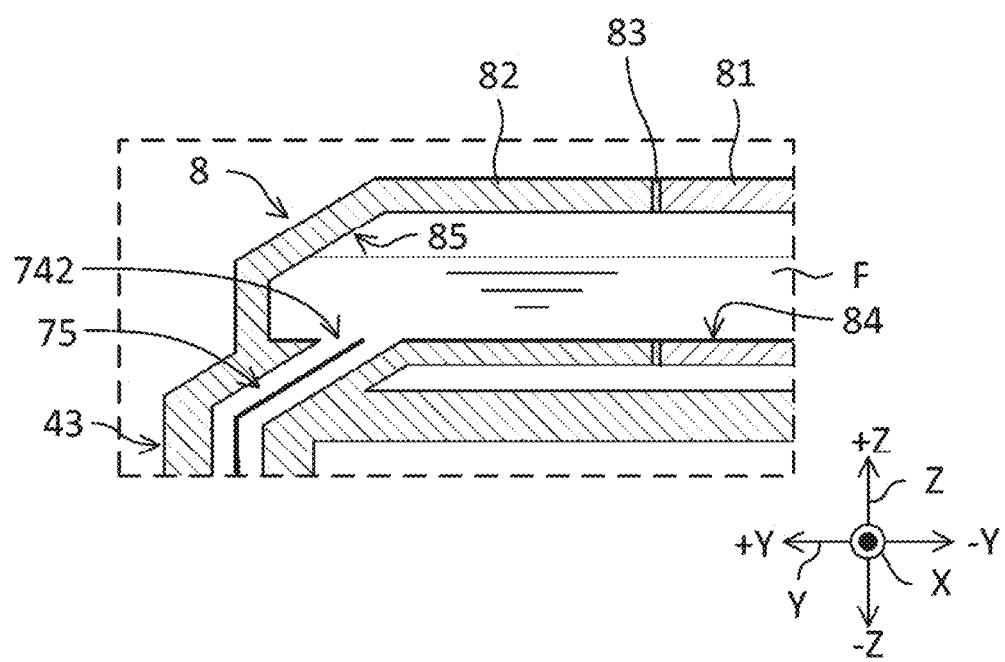
FIG. 13 is an enlarged cross-sectional view illustrating a modification example of a third outlet.

Next, the tank 8 will be described with reference to FIGS. 1 and 3, and FIGS. 10 to 13. FIG. 10 is a conceptual diagram illustrating the disposition of the tank 8. FIG. 11 is an enlarged cross-sectional view illustrating a configuration example of the tank 8. FIG. 12A is an enlarged cross-sectional view illustrating a first modification example of the tank 8. FIG. 12B is a cross-sectional view illustrating a second modification example of the tank 8. FIG. 13 is an enlarged cross-sectional view illustrating a modification example of the third outlet 742. Note that, FIG. 10 illustrates a schematic cross-sectional structure of the drive device 100 taken along a virtual plane which includes a dashed double-dotted line C-C in FIG. 3 and is orthogonal to the Y-axis direction. In FIG. 10, the illustration of the gear portion 3 and the like is omitted for easy viewing of the drawing. FIG. 11 is an enlarged view of a portion A surrounded by a broken line in FIG. 1. Each of FIGS. 12A to 13 corresponds to the portion A surrounded by the broken line in FIG. 1.

As described above, the fourth flow path 74 includes the tank 8. The tank 8 is connected to the other end portion of the third flow path 73 through the third inlet 741, and is connected to one end portion of the fifth flow path 75 through the third outlet 742. A flow path cross-sectional area of the tank 8 is wider than a flow path cross-sectional area of the third inlet 741. In the tank 8, the fluid F flows in the +Y direction. The "flow path cross-sectional area" is a cross-sectional area of an internal space of the tank 8 when the tank 8 is cut along a virtual plane perpendicular to a direction in which the fluid F flows in the tank 8. By doing this, since a large volume of the internal space of the tank 8 can be secured, the fluid F flowing into the fourth flow path 74 from the third flow path 73 can be reserved in the tank 8.

Accordingly, the fluid F can be smoothly supplied from the fourth flow path 74 to the fifth flow path 75 without interruption by disposing the tank 8.

The tank 8 has a tubular first tank member 81 and a tubular second tank member 82. The first tank member 81 extends in the +Y direction from the +Y direction side of the partition wall 42. The second tank member 82 extends in the −Y direction from the −Y direction side of the gear side lid portion 43 and is connected to an end portion of the first tank member 81 on the +Y direction side. In other words, the partition wall 42 has the first tank member 81, and the gear side lid portion 43 has the second tank member 82. By doing this, the tank 8 can be constituted by the first tank member 81 on the partition wall 42 side and the second tank member 82 on the gear side lid portion 43 side.

In the present embodiment, the tank 8 further has a sealing member 83. The end portion of the first tank member 81 on the +Y direction side is in contact with an end portion of the second tank member 82 on the −Y direction side via the sealing member 83. For example, an annular gasket disposed between both the end portions can be adopted as the sealing member 83. For example, as illustrated in FIG. 11, the tank 8 can be formed by fixing the gear side lid portion 43 to the partition wall 42 in a state where both the end portions abut on each other via the sealing member 83. By doing this, a connection portion between the end portion of the first tank member 81 on the +Y direction side and the end portion of the second tank member 82 on the −Y direction side can be sealed by the sealing member 83. Accordingly, it is possible to more reliably prevent the leakage of the fluid F at the connection portion between both the end portions.

Note that, the configuration of the tank 8 is not limited to the example of the present embodiment. As illustrated in FIGS. 12A and 12B, one of the end portion of the first tank member 81 on the +Y direction side and the end portion of the second tank member 82 on the −Y direction side may be fitted to the other.

For example, in FIG. 12A, an outer diameter of the end portion of the first tank member 81 on the +Y direction side and an inner diameter of the end portion of the second tank member 82 on the −Y direction side viewed from the Y-axis direction are the same to such an extent that a fitting structure of both the end portions can be formed. In FIG. 12A, the end portion of the first tank member 81 on the +Y direction side is fitted to the end portion of the second tank member 82 on the −Y direction side.

In addition, in FIG. 12B, an inner diameter of the end portion of the first tank member 81 on the +Y direction side and an outer diameter of the end portion of the second tank member 82 on the −Y direction side viewed from the Y-axis direction are the same to the extent that a fitting structure of both the end portions can be formed. In FIG. 12B, the end portion of the second tank member 82 on the −Y direction side is fitted to the end portion of the first tank member 81 on the +Y direction side.

By doing this, the tank 8 can be constituted by the fitting structure of the end portion of the first tank member 81 on the +Y direction side and the end portion of the second tank member 82 on the −Y direction side. As compared with the configuration in which both the end portions abut on each other and are connected as illustrated in FIG. 11, the configuration is hardly affected by a dimensional tolerance between both the end portions. Accordingly, the tank 8 can be easily constituted. In addition, for example, the leakage of the fluid F at the connection portion between both the end portions can be prevented without using the sealing member 83.

In addition, the tank 8 has the third outlet 742 and a bottom surface 84. The X-axis direction is a direction perpendicular to the Y-axis direction and the Z-axis direction (vertical direction). The third outlet 742 is disposed on the −Z direction side (vertically downward) and the −X direction side of the tank 8 when viewed in the Y-axis direction, and is connected to the fifth flow path 75. Preferably, the bottom surface 84 extends in the −Z direction (vertically downward) toward the −X direction. Note that, an inclination of the bottom surface 84 is set according to an inclination of the drive device 100 generated when the vehicle 300 having the drive device 100 mounted thereon turns left or right. By doing this, for example, even though the drive device 100 is inclined when the vehicle 300 having the drive device 100 mounted thereon turns right or left, the fluid F can be collected on the −X direction side of the tank 8 in which the third outlet 742 is disposed. Accordingly, the fluid F within the tank 8 can be supplied to the fifth flow path 75 without interruption. Thus, even though the drive device 100 is inclined, the fluid F can be stably supplied into the second shaft 310. However, this example does not exclude a configuration in which the bottom surface 84 does not expand in the −Z direction (vertically downward) as the bottom surface is directed in the −X direction. For example, the bottom surface 84 may be parallel to the X-axis direction when viewed from the axial direction, or may extend in the +Z direction (vertically upward) toward the −X direction. In the latter case, the fluid F can be appropriately reserved in the tank 8.

The third outlet 742 is the other end portion of the fourth flow path 74. Preferably, as illustrated in FIG. 11 and the like, the third outlet 742 is disposed at the end portion of the tank 8 on the +Y direction. By doing this, the fluid F can smoothly flow into the fifth flow path 75.

However, the disposition of the third outlet 742 is not limited to the example of FIG. 11. For example, as illustrated in FIG. 13, the third outlet 742 may be disposed away from the end portion of the tank 8 on the +Y direction side in the −Y direction. By doing this, the fluid F can be supplied to the fifth flow path 75 while appropriately reserving the fluid F in the tank 8.

In addition, preferably, as in the present embodiment, the tank 8 further has an inclined surface 85. The inclined surface 85 is disposed to face the third inlet 741 and extends in the +Y direction as the inclined surface is directed in the −Z direction (vertically downward) (see, for example, FIG. 10). By doing this, it is easy to guide the fluid F which flows into the tank 8 from the third inlet 741 and is in contact with the inclined surface 85 in the −Z direction (vertically downward).

At this time, an inner surface of one end portion of the fifth flow path 75 is connected to the inclined surface A direction in which one end portion of the fifth flow path 75 extends is parallel to the inclined surface 85. By doing this, the fluid F flowing along the inclined surface 85 can smoothly flow to one end portion of the fifth flow path 75.

However, this example of the present embodiment does not exclude a configuration in which the tank 8 does not have the inclined surface 85. Alternatively, even when the tank 8 has the inclined surface 85, the example of the present embodiment does not exclude a configuration in which the inner surface of one end portion of the fifth flow path 75 is not directly connected to the inclined surface 85 and a configuration in which the direction in which one end portion of the fifth flow path 75 extends is not parallel to the inclined surface 85.

The embodiment of the present invention has been described above. Note that, the scope of the present invention is not limited to the above-described embodiment. The present invention can be implemented by making various modifications to the above-described embodiment without departing from the gist of the invention. In addition, the matters described in the above-described embodiment can be discretionarily combined together as appropriate within a range where no inconsistency occurs.

The present invention is useful for a device that supplies a fluid in a housing to a motor portion.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device, comprising:
   a motor portion that has
      a rotor having a first shaft rotatable about a rotation axis extending in an axial direction, and
      a stator disposed radially outward of the rotor;
   a gear portion that is attached to one axial direction side of the first shaft;
   a housing that accommodates the motor portion and the gear portion; and
   a fluid flow path configured to allow a fluid to flow through,
   wherein
   the gear portion has a second shaft connected to one end portion of the first shaft in the axial direction,
   the housing includes
      a housing tubular portion that extends in the axial direction and accommodates the motor portion,
      a partition wall that closes one end portion of the housing tubular portion in the axial direction, and
      a gear side lid portion that is disposed at one end portion of the partition wall in the axial direction and constitutes a gear accommodation portion that accommodates the gear portion in cooperation with the partition wall,
   the fluid flow path has a first flow path, a third flow path, a fourth flow path, and a sixth flow path,
   one end portion of the first flow path is connected to the gear accommodation portion,
   the third flow path is disposed inside the partition wall and extends in a direction intersecting with the rotation axis,
   one end portion of the third flow path is connected to the gear accommodation portion through the first flow path,
   the fourth flow path is connected to an other end portion of the third flow path and extends toward the gear side lid portion,
   one end portion of the sixth flow path is connected to the other end portion of the third flow path, and
   an other end portion of the sixth flow path is disposed within the housing tubular portion.

2. The drive device according to claim 1, further comprising:
   a pump disposed at the fluid flow path.

3. The drive device according to claim 2, wherein
   the gear portion includes a differential rotatable about a differential axis extending along the axial direction,
   a first direction is a direction perpendicular to the axial direction and a vertical direction, and
   the pump is disposed between the rotation axis and the differential axis in the first direction.

4. The drive device according to claim 1, further comprising:
   a cooler disposed at the fluid flow path.

5. The drive device according to claim 1, further comprising:
   a pump and a cooler that are disposed at the fluid flow path.

6. The drive device according to claim 5, wherein
   the fluid flow path further has a second flow path connecting a first outlet of the pump and the one end portion of the third flow path, and
   the cooler is disposed at the second flow path.

7. The drive device according to claim 5, further including an output shaft to which power of the motor portion is transmitted from the gear portion,
   wherein
   the gear portion includes a differential attached to the output shaft,
   a first direction is a direction perpendicular to the axial direction and a vertical direction, and
   the cooler, the pump, and the output shaft overlap each other in the first direction.

8. The drive device according to claim 5, wherein
   a first direction is a direction perpendicular to the axial direction and a vertical direction,
   the sixth flow path further has a fluid supply member extending in the axial direction, and
   the fluid supply member is disposed between the pump and the cooler in the first direction.

9. The drive device according to claim 5, wherein the pump and the cooler are disposed on a radially outer surface of the housing tubular portion, and are aligned in a circumferential direction.

10. The drive device according to claim 5, wherein
    a first inlet of the pump is disposed on one axial direction side of the pump,
    a first outlet of the pump is disposed on an other axial direction side of the pump,
    a second inlet of the cooler is disposed on an other axial direction side of the cooler, and is connected to the first outlet, and
    a second outlet of the cooler is disposed on one axial direction side of the cooler, and is connected to the third flow path.

11. The drive device according to claim 10, wherein
    the cooler is disposed in one circumferential direction from the pump,
    the second inlet is disposed on the other axial direction side of the cooler and an other circumferential direction side of the cooler, and
    the second outlet is disposed on the one axial direction side of the cooler and one circumferential direction side of the cooler.

12. The drive device according to claim 1, wherein
    the fourth flow path has a third inlet and a tank,
    the tank is connected to the other end portion of the third flow path through the third inlet,
    a first direction is a direction perpendicular to the axial direction and a vertical direction, and
    the tank is disposed on a side of the rotation axis in the first direction.

13. The drive device according to claim 1, wherein
the fluid flow path further has a fifth flow path disposed inside the gear side lid portion, and
an other end portion of the fifth flow path is connected to one end portion of the second shaft in the axial direction.

14. The drive device according to claim 1, wherein
the housing further has a bearing holding portion that rotatably holds the first shaft via a bearing,
the sixth flow path has a fluid supply member that is disposed radially outward of the stator to supply the fluid to the stator, and
the fluid supply member has at least one supply hole that is opened to at least one of the stator and the bearing.

15. The drive device according to claim 1, wherein
the fourth flow path has a third inlet and a tank,
the tank is connected to the other end portion of the third flow path through the third inlet, and
a flow path cross-sectional area of the tank is wider than a flow path cross-sectional area of the third inlet.

16. The drive device according to claim 15, wherein
the tank has
a first tank member having a tubular shape and extending from one axial direction side of the partition wall toward the gear side lid portion, and
a second tank member that has a tubular shape extending from an other axial direction side of the gear side lid portion toward the partition wall and is connected to one end portion of the first tank member in the axial direction.

17. The drive device according to claim 16, wherein
the one end portion of the first tank member in the axial direction is fitted into an other end portion of the second tank member in the axial direction, or
the other end portion of the second tank member in the axial direction is fitted into the one end portion of the first tank member in the axial direction.

18. The drive device according to claim 16, wherein the one end portion of the first tank member in the axial direction is fitted with an other end portion of the second tank member in the axial direction via a sealing member.

19. The drive device according to claim 15, wherein
a first direction is a direction perpendicular to the axial direction and a vertical direction, and
the tank has
a third outlet that is disposed vertically downward of the tank and on one side of the first direction when viewed from the axial direction, and
a bottom surface extending vertically downward toward the one side of the first direction.

20. The drive device according to claim 1, wherein
the fluid flow path further includes a seventh flow path,
one end portion of the seventh flow path is connected to an other end portion of the sixth flow path in the axial direction, and
an other end portion of the seventh flow path is connected to an other end portion of the first shaft in the axial direction.

* * * * *